(12) United States Patent
Kocer et al.

(10) Patent No.: US 12,302,894 B2
(45) Date of Patent: May 20, 2025

(54) AGRICULTURAL WEED DISPATCHING IMPLEMENTS

(71) Applicant: Raven Industries, Inc., Sioux Falls, SD (US)

(72) Inventors: Jared Ernest Kocer, Sioux Falls, SD (US); Brent A. Driesen, Alvord, IA (US)

(73) Assignee: Raven Industries, Inc., Sioux Falls, SD (US)

( * ) Notice: Subject to any disclaimer, the term of this patent is extended or adjusted under 35 U.S.C. 154(b) by 773 days.

(21) Appl. No.: 17/552,153

(22) Filed: Dec. 15, 2021

(65) Prior Publication Data

US 2022/0183265 A1  Jun. 16, 2022

Related U.S. Application Data

(60) Provisional application No. 63/125,534, filed on Dec. 15, 2020.

(51) Int. Cl.
*A01M 7/00* (2006.01)
*A01C 23/02* (2006.01)
*A01M 21/04* (2006.01)

(52) U.S. Cl.
CPC ......... *A01M 7/0089* (2013.01); *A01C 23/023* (2013.01); *A01C 23/028* (2013.01); *A01M 7/0042* (2013.01); *A01M 21/043* (2013.01)

(58) Field of Classification Search
CPC .............. A01M 7/0089; A01M 7/0042; A01M 21/043; A01C 23/023; A01C 23/028
See application file for complete search history.

(56) References Cited

U.S. PATENT DOCUMENTS

| 3,959,924 A | 6/1976 | Allen, Jr. |
| 4,756,260 A | 7/1988 | Petersen |
| 5,279,068 A | 1/1994 | Rees et al. |

(Continued)

FOREIGN PATENT DOCUMENTS

| EP | 3476216 A1 | 5/2019 |
| EP | 3636064 A2 | 4/2020 |

(Continued)

OTHER PUBLICATIONS

"International Application Serial No. PCT/US2021/063622, International Search Report mailed Feb. 28, 2022", 3 pgs.

(Continued)

*Primary Examiner* — Tara Mayo
(74) *Attorney, Agent, or Firm* — Schwegman Lundberg & Woessner, P.A.

(57) ABSTRACT

An agricultural implement that can concurrently cultivate and spray includes an implement support frame. A plurality of cultivator row units is coupled with the implement support frame. Each cultivator row unit of the plurality of cultivator row units includes a dispatching implement. A sprayer system coupled with the implement support frame includes a fluid holding tank coupled with the implement support frame. The sprayer system includes a fluid pump in fluid communication with the fluid holding tank. The sprayer system includes a plurality of fluid nozzles in fluid communication with the fluid holding tank. Each of the fluid nozzles of the plurality of fluid nozzles is configured to direct fluid between cultivator shovels of the plurality of cultivator row units.

19 Claims, 16 Drawing Sheets

(56) References Cited

U.S. PATENT DOCUMENTS

| | | |
|---|---|---|
| 5,606,821 A | 3/1997 | Sadjadi et al. |
| 5,842,307 A | 12/1998 | May |
| 7,860,628 B2 | 12/2010 | Lange |
| 8,359,141 B1 | 1/2013 | Lange |
| 8,924,092 B2 | 12/2014 | Achen et al. |
| 10,019,010 B2 | 7/2018 | Peake et al. |
| 10,327,374 B2 | 6/2019 | Achen et al. |
| 10,349,573 B2 | 7/2019 | Peake et al. |
| 10,845,810 B2 | 11/2020 | Flajolet et al. |
| 2007/0289511 A1 | 12/2007 | Chen et al. |
| 2008/0302888 A1 | 12/2008 | Puck |
| 2018/0015490 A1 | 1/2018 | Grimm et al. |
| 2018/0111148 A1 | 4/2018 | Batcheller et al. |
| 2018/0325011 A1 | 11/2018 | Connell |
| 2020/0068779 A1 | 3/2020 | Barker et al. |
| 2020/0084954 A1 | 3/2020 | Sporrer et al. |
| 2020/0236833 A1 | 7/2020 | Kremmer et al. |
| 2020/0236837 A1 | 7/2020 | Kremmer et al. |
| 2020/0337210 A1 | 10/2020 | Hertzog et al. |

FOREIGN PATENT DOCUMENTS

| | | |
|---|---|---|
| EP | 3636064 A3 | 7/2020 |
| FR | 2345898 A1 | 10/1977 |
| WO | 2019090369 A2 | 5/2019 |
| WO | 2022132975 | 6/2022 |

OTHER PUBLICATIONS

"International Application Serial No. PCT US2021/063622, Written Opinion mailed Feb. 28, 2022", 9 pgs.

"International Application Serial No. PCT US2021 063622, International Preliminary Report on Patentability mailed Apr. 11, 2023", 12 pgs.

"European Application Serial No. 21907748.4, Extended European Search Report mailed Aug. 22, 2024", 9 pgs.

AGRICULTURAL WEED DISPATCHING IMPLEMENTS

RELATED APPLICATION

This application claims the benefit of priority to U.S. Provisional Patent Application No. 62/125,534 titled "Agricultural Weed Dispatching Implements" and filed on Dec. 15, 2020, which is incorporated by reference herein in its entirety.

TECHNICAL FIELD

This document pertains generally, but not by way of limitation, to agricultural weed dispatching implements and the application of agricultural products.

BACKGROUND

Crop cultivation and weed dispatching is a process of digging up unwanted flora proximate to a crop. In cultivation, a dispatching implement is attached to a vehicle in an example arrangement. The dispatching implement includes one or more cultivator shovels that penetrate the ground between rows of crop. The cultivator shovel breaks up and overturns unwanted flora into the soil between crop rows.

In other examples, agricultural products such as fertilizers, herbicides, pesticides, or the like are applied to crops with agricultural sprayers. A sprayer includes a plurality of spray nozzles in communication with one or more reservoirs of agricultural products. As the sprayer travels through a field the spray nozzles are opened and apply the agricultural product along the crop rows to the crops therein.

SUMMARY

The present inventors have recognized, among other things, that a problem to be solved includes consolidating operations of disparate agricultural vehicles and implements in fields while at the same time enhancing performance of component implements. For example, with broad application of agricultural products an agricultural sprayer travels along multiple rows and provides continuous or near continuous application of the products from spray nozzles directed toward the crop rows. In some examples, agricultural products applied to crops are alleged to have potential adverse impacts in addition to benefits to a crop. In contrast, a targeted approach to application of agricultural products (e.g., to individual plants, weeds, crops, or the like) is a difficult task for an agricultural vehicle.

In other examples, cultivation with one or more cultivator shovels or other weed dispatching implements associated with an agricultural cultivator are conducted to mechanically address harmful plants, such as weeds, without using broadly applied agricultural products. The dispatching implements are positioned by a controller between crop rows and mechanically engage with the soil and harmful plants. The dispatching implement damage or destroy the harmful plants while at the same time breaking up and overturn the soil (and covering the harmful plants with the soil). However, dispatching implements can adversely impact crops. As a cultivator moves along a row even minor course adjustments cause movement of dispatching implements, and the moving dispatching implements may drift into crops, and cause damage or crop destruction. Further, at the end of a crop row (and in some cases within a crop row), the crop is planted in an arc. To maneuver through the arc, the agricultural vehicle makes a turn. Because the dispatching implement is hitched to the agricultural vehicle, the dispatching implements swing in a direction opposite that of the turn and toward proximate crops. This swing (if beyond the gap between crop rows and the shovel) damages a crop with the dispatching implements. Accordingly, because of the difficulty of cultivation it may be more expedient to broadly apply agricultural products to reduce the impact of undesirable flora and minimize damage to crops.

An improvement can reduce broad application chemical spray. Instead of using a dedicated chemical sprayer that uniformly distributes a chemical across a field, the present system sprays more selectively in one example. A cultivator can be fitted with a spray system. The spray system can include a sensor, such as a camera, a fluid holding tank, a pump, a flow nozzle, and a controller configured to control the pump or flow nozzle. Data from the sensor can be used by the controller to detect undesirable flora around the crop or the crop itself. The spray system can selectively provide the fluid to only those locations determined to include the undesirable flora or the crop itself.

Another improvement of such a spray system includes reduced spray due to proximity of a spray nozzle to the ground. Current spray systems often include one or more spray arms extending from a cab of a vehicle. Such spray arms typically include fixed nozzles that direct the chemical spray straight down. The spray arm is typically associated with a sprayer boom and is at an elevated position relative to an implement support frame of a cultivator and the ground. This increased height reduces the accuracy of the chemical spray and facilitates interference with the spray by an external influence like wind. An improvement can include providing a movable nozzle. The control of the nozzle movement (e.g., including orientation, elevation, or the like) can direct the fluid to the identified undesirable flora or otherwise to only to specific locations (e.g., identified crops, crop rows, or the like). The adjustment of the nozzle can be controlled using the controller and the sensor. The adjustment of the nozzle can be angular to change spray direction or elevation to change spray distance. In some examples, a spray assembly can include an electrostatic spray nozzle. Such electrostatic spray nozzles can focus liquid from the tank onto a plant and not on the ground. Using an electrostatic nozzle can reduce the amount of liquid dispensed compared to other spray solutions.

Another improvement includes reducing an amount of crop that is damaged by a dispatching implement. In fields rows of crop can be unevenly spaced apart, extend along curves or arcs, follow terrain contours with elevation changes and grades or the like. Crop rows that vary in one or more of these characteristics (e.g., crop row characteristics) are problematic for a dispatching implement to navigate without damaging the crop. An improvement can include angular rotation of a dispatching implements, translational adjustment of the dispatching implement, or elevation control of the dispatching implement (e.g., collectively cultivator manipulation) relative to the implement support frame or hitch assembly, to minimize damaging a crop while continuing cultivation proximate to the crop rows.

In one example, dispatching implement manipulation includes angular rotation. Angular rotation of the dispatching implements is, in one example, facilitated using an angular rotation system. The angular rotation system can include a controller coupled with a sensor. The sensor can provide data indicative of a distance between a dispatching implement (including a portion of a dispatching implement, such as the shovel edge, a fiducial marker of the dispatching implement or the like) and a crop. The controller can adjust an angular orientation of the dispatching implement relative to an implement support frame or hitch assembly. The angular adjustment can control (e.g., modulate, maintain, or reduce) a distance between a crop intersection threshold (e.g., a minimum distance of the shovel from the crop, specified distance of the dispatching implement from the crop, specified distance of the dispatching implement relative to a crop row gap line) and a position of the dispatching implement. This angular adjustment can help ensure that the dispatching implement is sufficiently close to the crop to cultivate undesirable flora that affects the crop, yet far enough away to isolate the crop and minimize damage to the crop. In some examples, the sensor can include a mechanical feeler or a no contact sensor. The no contact sensor can help center the cultivator shovel between rows of crop. The mechanical feeler, sometimes called a feeler gauge, can determine whether an object is within a specified distance of an object to which the feeler gauge is attached.

When the controller determines that the cultivator shovel is within the crop intersection threshold (e.g., a distance or between the shovel and the threshold is zero or less), the controller can cause a rotation actuator to adjust the angular orientation of the dispatching implement to be outside of, or at, the crop intersection threshold. This is useful to avoid uneven rows, unevenly spaced rows, arcs, turns or angles in crop rows, and drifting of the implement because of grade or elevation changes or the like. The controller can cause the rotation actuator to adjust the angular orientation of the dispatching implements to minimize (e.g., reduce or eliminate) damage to the crop.

The rotation actuator can be coupled to a hitch assembly. In such a configuration, the rotation actuator adjusts an angular orientation of all dispatching implements together. Another improvement provides more individualized control of the cultivator shovels including independent manipulation of one or more dispatching implements relative to other dispatching implements of the implement. Such an improvement can include a rotation actuator coupled to a row unit frame or a dispatching implement support frame. The rotation actuator, in this configuration, can adjust a proper subset (less than all) of the dispatching implements, thus allowing the cultivator to account for one or more meandering rows while maintaining shovel positions dispatching implements in otherwise consistent rows.

The rotation actuator, in some examples, include a first cylinder and a first piston and a second cylinder and a second piston. The first cylinder and piston are translationally offset from the second cylinder and piston. A dispatching implement can be manipulated by extending or retracting one or more of the first piston or the second piston, the angular orientation of a dispatching implement is adjusted.

The translational adjustment of the dispatching implement is facilitated using a lateral positioning system in some examples. The lateral positioning system includes a controller coupled with a sensor in one example. The sensor provides data indicative of a distance between a dispatching implement and a crop. The controller, by a lateral position actuator, adjusts a translational position of the dispatching implement on the implement support frame. The translational adjustment reduces or increases a distance between a crop intersection threshold and a position of the dispatching implement. This translational adjustment can help ensure that the dispatching implement is sufficiently close to or far away from the crop to cultivate undesirable flora that affects the crop, yet far enough away from the crop to avoid damaging the crop.

When the controller determines that the dispatching implement is within the crop intersection threshold (e.g., a distance or between the dispatching implement and the threshold is zero or less), the controller can cause the lateral position actuator to adjust the angular orientation of the dispatching implement to be outside of, or at, the crop intersection threshold. This is useful to avoid uneven rows, unevenly spaced rows, arcs, turns or angles in crop rows, and drifting of the implement because of grade or elevation changes or the like. The controller can cause the lateral position actuator to adjust the angular orientation of the dispatching implements to minimize (e.g., reduce or eliminate) damage to the crop.

The lateral position actuator can be coupled between a row unit support frame and an implement support frame. The lateral position actuator, in this configuration, can adjust all or a proper subset (less than all) of the dispatching implements. The implement thereby provides enhanced precise control of one or more of the dispatching implements to conduct cultivation with curved crop rows, changes in crop row orientation or spacing or the like while minimizing (e.g., reducing or eliminating) crop damage. The lateral position actuator can include a first cylinder and a first piston. By extending or retracting the first piston, the translational position of a coupled dispatching implement can be adjusted.

Another improvement includes reducing drag, and ultimately fuel consumption, of a cultivator in some examples. The improvement is realized using a sensor coupled with a controller and an elevation actuator in these examples. The sensor provides data indicating a load on a dispatching implement. The controller identifies when the load exceeds a fouling threshold. The controller can, in response to determining the load is greater than (or equal to) the fouling threshold, cause the elevation actuator to lift or otherwise manipulate the dispatching implement. Manipulating the dispatching implement can clear debris accumulated or otherwise caught on the cultivator shovel, thus reducing the load on the dispatching implement. Additionally, or alternatively, the sensor is a vision sensor that provides data that is used by the controller to identify undesirable flora. If the controller determines that undesirable flora is present, the controller causes the elevation actuator to move the shovel and initiate cultivation (e.g., a deeper cultivation to damage organized flora). If the controller fails to detect undesirable flora, the controller causes the elevation actuator to elevate. Such a selective cultivation reduces drag and ultimately fuel consumption of the cultivator.

The improvements can be realized individually or in combination. Other improvements can be realized with the teaching of this disclosure. This summary is intended to provide an overview of subject matter of the present disclosure. It does not provide an exclusive or exhaustive explanation of the improvements. The detailed description is included to provide further information about the improvements and how they are realized.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As previously discussed in the Summary, the present inventors have recognized, among other things, that a problem to be solved includes consolidating operations of disparate agricultural vehicles and implements in fields while at the same time enhancing performance of component implements. For example, with broad application of agricultural products an agricultural sprayer travels along multiple rows and provides continuous or near continuous application of the products from spray nozzles directed toward the crop rows. In some examples, agricultural products applied to crops are alleged to have potential adverse impacts in addition to benefits to a crop. In contrast, a targeted approach to application of agricultural products (e.g., to individual plants, weeds, crops, or the like) is a difficult task for an agricultural vehicle.

In other examples, cultivation with one or more cultivator shovels or other weed dispatching implements associated with an agricultural cultivator are conducted to mechanically address harmful plants, such as weeds, without using broadly applied agricultural products. The dispatching implements are positioned by a controller between crop rows and mechanically engage with the soil and harmful plants. The dispatching implement damage or destroy the harmful plants while at the same time breaking up and overturn the soil (and covering the harmful plants with the soil). However, dispatching implements can adversely impact crops. As a cultivator moves along a row even minor course adjustments cause movement of dispatching implements, and the moving dispatching implements may drift into crops, and cause damage or crop destruction. Further, at the end of a crop row (and in some cases within a crop row), the crop is planted in an arc. To maneuver through the arc, the agricultural vehicle makes a turn. Because the dispatching implement is hitched to the agricultural vehicle, the dispatching implements swing in a direction opposite that of the turn and toward proximate crops. This swing (if beyond the gap between crop rows and the shovel) damages a crop with the dispatching implements. Accordingly, because of the difficulty of cultivation it may be more expedient to broadly apply agricultural products to reduce the impact of undesirable flora and minimize damage to crops.

Figure 1:
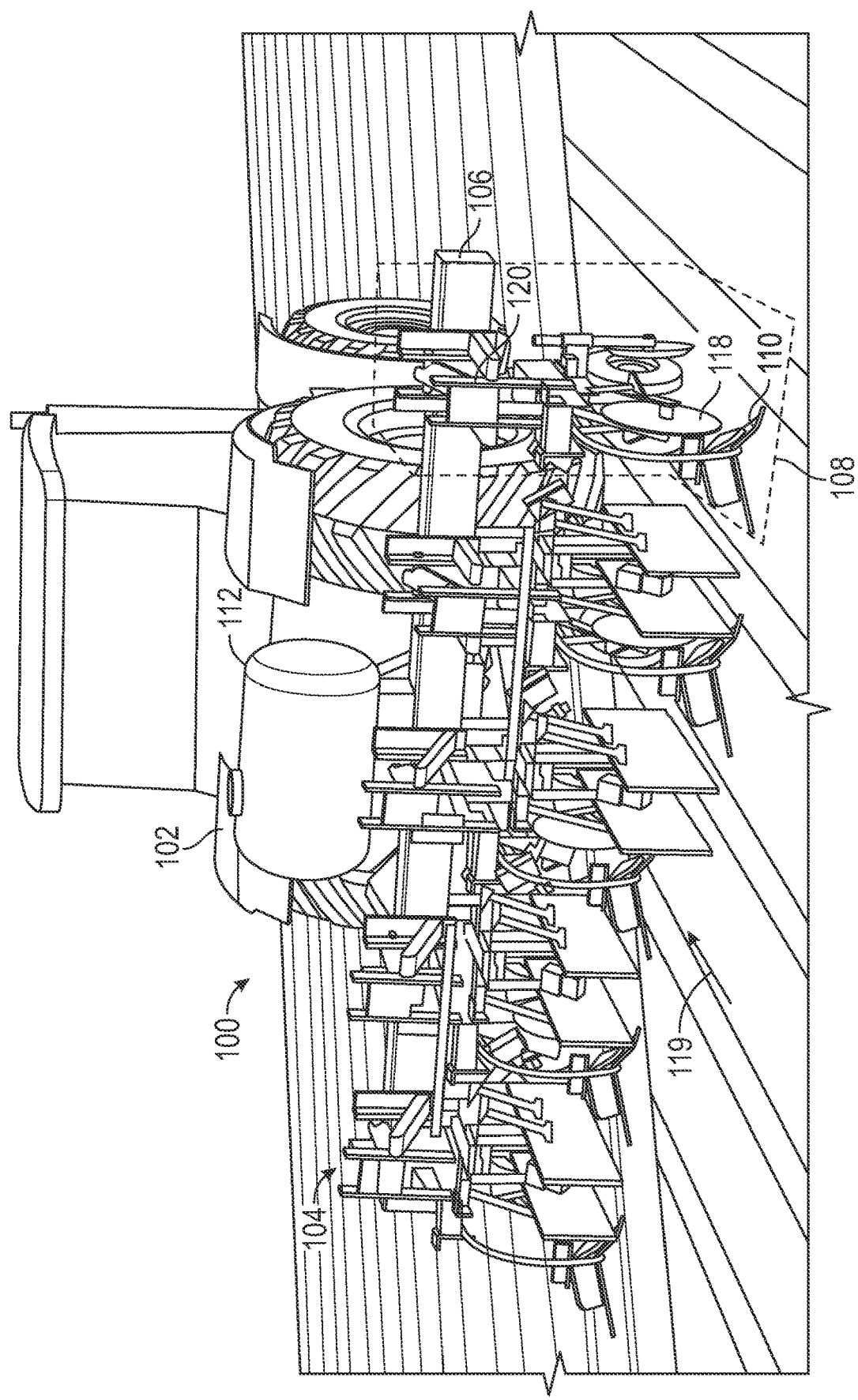
FIG. 1 is a perspective view of an agricultural system including an agricultural vehicle and one example of an agricultural implement in a field.

FIG. 1 is a perspective view of an agricultural system 100 including an agricultural vehicle and one example of an agricultural implement in a field. The agricultural system includes a mover 102 coupled to an implement 104. The mover 102 can include a tractor or other vehicle capable of receiving and coupling (e.g., electrically, or mechanically) with the implement 104 and traveling across a planted field. The mover 102 can be autonomous, semi-autonomous, fully manual, or the like. The mover 102 can include a movable frame with a socket for reception of an implement and having ground engaging elements (e.g., wheels, tracks, or the like).

The implement 104 includes a support frame 106 coupled to a plurality of row units 108. The implement 104 includes components configured to provide simultaneous flora dispatching (e.g., cultivation) and spray capabilities in some examples. The implement 104 includes components configured to rotationally and/or translationally alter an orientation of a dispatching implement 110 (e.g., cultivator shovel in the example of FIG. 1) relative to the support frame 106 in some examples. The implement 104 includes components configured to manipulate the dispatching implement. Manipulate can include altering depth, elevation, translation, orientation, or the like, in some examples.

The implement support frame 106 provides mechanical support for row units 108. The implement support frame 106 includes a hitch to couple the implement 104 to the mover 102. Conduit and/or electrical wires can run through the implement support frame 106. The conduit couples the tank 112 and the spray assemblies 114. The electrical wire electrically couples a sensor 220 and a controller 230 (see FIG. 2). The electrical wires (e.g., hardwiring, buses, or the like) electrically couple controller 230 and assemblies 114.

One or more dispatching implement row units 108 are mechanically coupled to the implement support frame 106. The row units 108 include a dispatching implement support frame 228 (see FIG. 2). Each dispatching implement row unit 108 includes a dispatching implement 110 (e.g., a cultivator shovel in FIG. 1 or other implements discussed herein and their equivalents). The support frame 106 provides mechanical coupling between the row units 108 and the mover 102. Additionally, the support frame 106 manipulates the dispatching implement including, but not limited to, changing depth, elevation, translation, orientation, or the like. In the example shown in FIG. 1, a disc 118 is provided with the row unit 108 and helps break up soil prior to contact with the dispatching implement 110, in some examples.

In the example shown in FIG. 1, one or more of the row units 108 are manipulated relative to other row units. For instance, the row units 108 on the left side of the implement 104 of FIG. 1 are elevated to avoid interfering with crop along transverse crop rows (shown in the background). Conversely, the row units 108 on the right sight of the implement are lowered (and conducting cultivation) within the crop rows in the foreground. As discussed herein, the elevation of the row units 108 is controlled by a controller 230 (see FIG. 2) and a dispatching implement actuator 224 (see FIG. 2).

A row unit support frame 120 provides mechanical support for a row unit 108. The row unit support frame 120 can include one or more rigid, elongated members, such as bars. The row unit 108 can be attached to the support frame 120, such as to extend from the support frame 120. The row unit support frame 120 attaches to the implement support frame 106. The row unit support frame 120 is an interconnecting frame that couples a respective row unit 108 with the support frame 106. The row unit support frame 120 provides a mechanism to independently actuate each of the row units 108 relative to other row units, and can work in cooperation with the manipulation provided to all of the row units 108 through manipulation at the support frame 106

The cultivator shovel breaks up soil and flora, such as to unroot flora. The cultivator shovel is an example of the dispatching implement 110. Other examples of dispatching elements include, but are not limited to, laser implements, electrostatic implements, blades, or the like. Manipulation of the orientation of the support frame 120 or the support frame 106 changes a depth, elevation, orientation (pitch, yaw, etc.), distance from the support frame 120, or the like.

Dispatching can interfere with crops (e.g., damage, uproot, overrun or the like), for instance with crops in transverse crop rows as shown in the background in FIG. 1. In this example, if dispatching continues in a direction indicated by arrow 119 at least the dispatching implements 110 of the one or more row units 108 on the left of the system 100 will overturn and destroy crops (e.g., interfere) in the forthcoming transverse rows. To mitigate interference, the dispatching implement is manipulated (e.g., elevated, rotated, translated along the support frame 106, a combination thereof, or the like) to protect the forthcoming crops. Arrow 119 indicates the direction of implement 104 and mover 102 current travel.

A tank 112 can be mechanically coupled to the mover 102 or the support frame 106. The tank 112 holds fluid (e.g., a carrier fluid with one or more agricultural products) provided to spray assemblies 114 (see FIG. 2). Fluid from tank 112 can be provided to fluid nozzles via a gravity feed, a fluid pump, or the like. The fluid can include herbicide, pesticide, fertilizer, water, or the like. The fluid can be an agricultural product. The fluid is provided to crop or between rows of crop through a spray nozzle of a spray assembly 114 (see FIG. 2).

Figure 2:
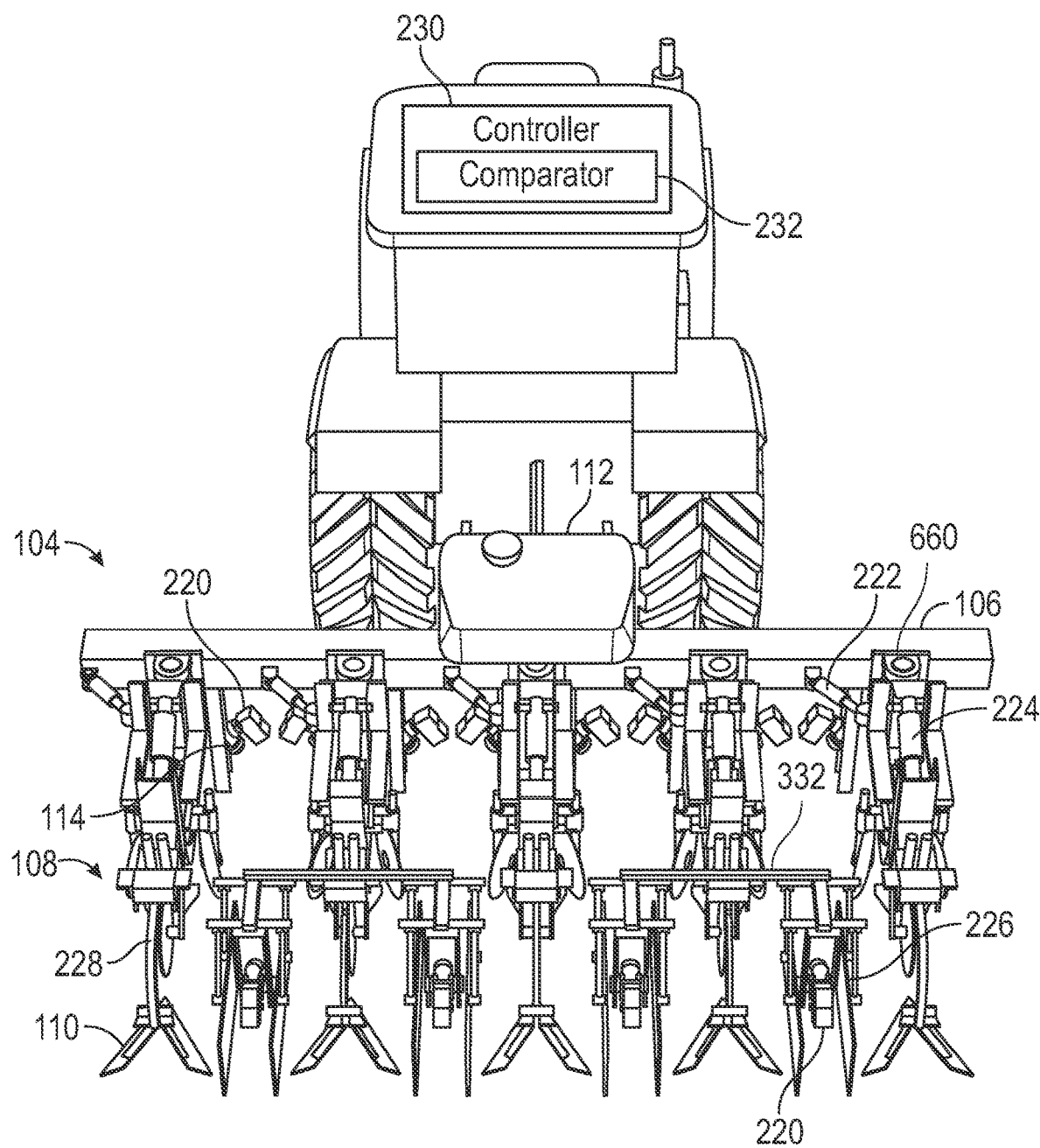
FIG. 2 is a perspective view of the agricultural system of FIG. 1 with a more detailed view of the agricultural implement.

FIG. 2 is a perspective view of the agricultural system of FIG. 1 with a more detailed view of the agricultural implement 104. The agricultural implement includes the tank 112, the implement support frame 106, cultivator shovels (example dispatching implements 110), a spray assembly 114, a crop characteristic sensor 220, a controller 230, a comparator 232, a row unit rotation actuator 222, an elevation actuator 224, a crop shield 226, and a dispatching implement support frame 228.

The spray assembly 114 is in fluid communication with fluid in the tank 112. The Spray assembly 114 includes a nozzle that, in some examples, is manipulable with one or more associated actuators coupled with the spray assembly 114. The actuators alter one or more of an elevation of the spray nozzle, direction of spray, spray pattern or the like. The spray assembly 114 moves with the row unit 108 and is therefore manipulable in the same ways as other items attached to the row unit 108 like the dispatching element 110. The spray assembly 114 is configured for direction at one or more of crops or between rows of crop (e.g., furrows). Optionally, the actuators associated with the spray nozzle orient the spray nozzle toward the crops or furrows as specified. The spray assembly 114 includes a nozzle and an electrically actuatable control valve. The spray nozzle actuator opens and closes the nozzle, under control of the controller 230.

The crop characteristic sensor 220 can include, but is not limited to, a camera, video camera, or other imaging device that converts electromagnetic energy incident thereon to pixel values; sound sensor; radio detection and ranging (RADAR), light detection and ranging (LIDAR), mechanical feelers, or the like. The electromagnetic energy can be visible, infrared, ultraviolet, radio waves (i.e., radar) or the like. The sensor 220 can include an optical or sound emitting device, such as ultrasound, that cooperates with a receiver of the sensor 220 to determine the distance based on a time of flight or intensity of returned light or sound. The sensor 220 can be oriented on a row unit 108 or the support frame 106. The sensor 220 can be oriented to monitor a crop characteristic (e.g., flora identification (e.g., crop, weed, height, stalk width, foliage, etc.), location, or dimensions, row spacing between crops, or the like). In the example shown in FIG. 1, the sensors 220 are oriented to monitor crop. In another example, the sensor 220 is oriented to have different or wider field of view including weeds or other flora. In some examples, data from the sensor 220 is used by the controller 230 to modulate manipulation of the dispatching implement 110. For example, the sensor 220 determines a distance between the dispatching implement 110 and the crop row or ground including another distance measurement (e.g., between the sensor and the ground) that is processed for control of the dispatching implement 110. In such examples, the sensor 220 is a position sensor. The sensor 220 can include mechanical feelers. The sensor 220 can be mounted at one, two, or more locations along a row unit 108 and facilitates control of one or more proximate dispatching implements 110. The example in FIG. 2 shows the sensor 220 between dividers of the crop shield 226 and also between row units 108 (closer to the implement support frame 106). In other examples, the sensor 220 is positioned on the row unit support frame 120, proximate to the dispatching element 110, on the implement support frame 106, or the like.

Referring again to FIG. 2, a row unit rotation actuator 222 is coupled between the implement support frame 106 and an associated row unit 108 and provides independent or coordinated control of the row units 108 (having their own row unit rotation actuators 222). The row unit rotation actuator 222 is configured to move the row unit 108 relative to the support frame 106. For instance, in the example shown the row unit rotation actuator 222 is operable to rotate (including rotating, pivoting, swinging or the like) the row unit 108 and the associated dispatching implement 110. As shown in FIG. 2 the row unit rotation actuator 222 turns the row unit 108 and the associated dispatching implement 110 relative to the support frame 106. The row unit rotation actuator 222 includes, but is not limited to, a piston and cylinder (hydraulic or pneumatic); screw drive, linkage or the like that rotates the row unit 108 about a pivot pin, similar articulating joint, or pivot assembly 660.

Referring again to FIG. 2, an elevation actuator 224 is coupled between the implement support frame 106 and the row unit support frame 120 (see FIG. 1 for the row unit support frame 120). The elevation actuator 224 provides independent or coordinated control of the row units 108 (having their own actuators 224). The elevation actuator 224 alters an elevation of the dispatching element 110 relative to the ground. The actuator 224 can extend to increase depth of shovel or other dispatching implement 110 in the soil. The actuator 224 can retract to decrease the depth of the cultivator shovel or elevate the cultivator shovel or another dispatching implement 110. The elevation actuator 224 includes, but is not limited to, a piston and cylinder (hydraulic or pneumatic); screw drive, linkage or the like that alters elevation of the row unit 108.

Referring again to FIG. 2, a crop shield 226 is coupled to a shield bracket 232 between row units 108. The shield bracket 232 is coupled to the row unit support frame 120 and extends laterally from the row unit support frame 120, generally parallel with the implement support frame 106. The crop shield 226 protects the crop from matter such as soil, stones or the like overturned and displaced by the dispatching implement 110, such as the cultivator shovel, or another dispatching implement. The crop shield 226 intercepts the matter and prevent damage to the crops. Because the crop shield 226 is coupled with the row unit 108, the crop shield 226 can be manipulated (optionally) with the dispatching implements 110. Accordingly, the dispatching function can be constrained in a dynamic manner (between the manipulated shields 226) and similarly the crops are protected in a dynamic manner (by the shields 226).

The dispatching element support frame 228 is coupled to and extends from the row unit support frame 120. The dispatching element 110 is coupled to the dispatching implement support frame 228. The dispatching element support frame 228 can be semi-rigid or semi-flexible, such as to absorb some force from the dispatching element 110.

Figure 3:
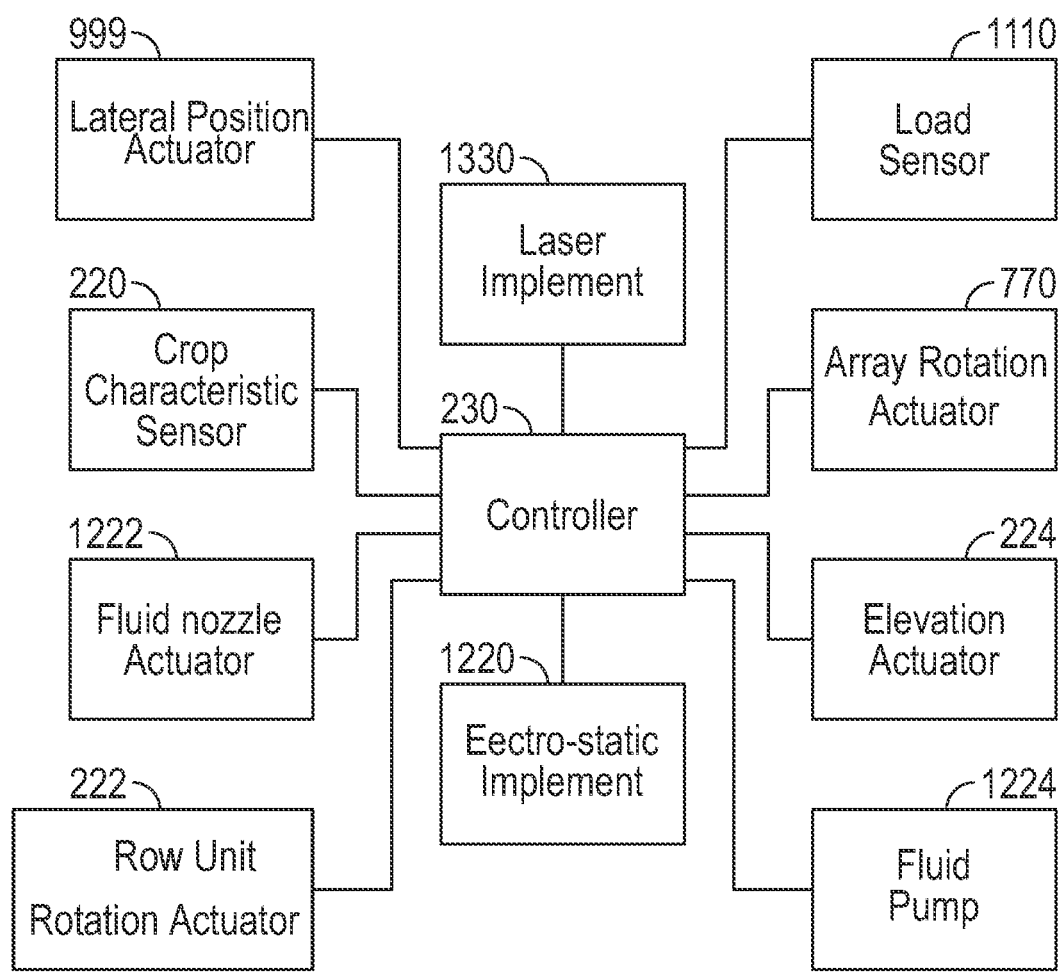
FIG. 3 is a logical diagram of a control system for an agricultural implement.

FIG. 3 is a logical diagram of a control system for an agricultural implement, for instance housed or at least partially located within the controller 230 shown in FIG. 2. The controller 230, in some examples, is communicatively coupled to one or more of the linear position actuator 999; the crop characteristic sensor 220; a fluid nozzle actuator 1222; the row unit rotation actuator 222; a load sensor 1110; an array rotation actuator 770; the elevation actuator 224; a laser implement 1330, an electrostatic implement 1220 (both examples of dispatching implements); or a fluid pump 1224.

The controller 230 receives data from the sensors 220, 1110 and controls position of the dispatching elements 110 based on the received data. The received data, in some examples, indicates a location of flora, such as unwanted flora or the crop. The received data indicates, in some example, a location of the crop row. The controller 230 can alter one or more of the linear position actuator 999, the row unit rotation actuator 222, array rotation actuator 770, or the elevation actuator 224 to alter an orientation of the dispatching element 110 relative to the crop, weed, or the crop row. The controller 230 can alter the position to increase the dispatching of weed, decrease the dispatching of crop, or decrease the amount of time the dispatching element 110 is in the crop row. The controller 230 detects a crop is within a specified threshold distance of a dispatching implement 110 (e.g., the cultivator shovel, the laser implement 1330, or the electrostatic implement 1220) or other component of the implement 104 and can cause the row unit rotation actuator 222, array rotation actuator 770, elevation actuator 224, linear position actuator 999, or other actuator, to adjust a position of the component relative to the crop. The controller 230 detects a weed based on data from the crop characteristic sensor 220, for example, and changes an elevation or depth of a cultivator shovel, turns on the electrostatic implement 1220 or the laser implement 1330 to dispatch the weed.

The fluid pump 1224, in some examples, is coupled to the implement support frame 106, the tank 112, a row unit 108, the hitch assembly 330, or other part of the mover 102 or implement 104. The fluid pump 1224 is not needed in some embodiments that use gravity to feed the water to the spray assemblies 114. The controller 230 detects a weed based on data from the crop characteristic sensor, for example, and causes, by the fluid pump 1224 and/or fluid nozzle actuator 1222, spray of an herbicide, to help eliminate the weed.

One or more of (i) a hitch assembly 330 with an array rotation actuator 770, (ii) rotation actuator per row unit 108, (iii) rotation actuator 222 per dispatching implement 110, (iv) a hitch assembly 330 with a lateral displacement system 990, (v) a lateral displacement system 990 per row unit 108, or (vi) a lateral displacement system 990 per dispatching implement 110 can alter the angle and/or lateral position of the dispatching implement 110 relative to a crop. The controller 230 can activate one or more of (i) the dispatching implement actuator 224, (ii) the rotation actuator 222, (iii) the lateral position actuator 999, or other actuator to manipulate the position of the dispatching implement relative to the crop. The controller 230 can cause the rotation actuator 222 to alter the angular position of the one or more dispatching implements to reduce a difference between the detected position and a crop intersection threshold. The rotation actuator 222 controls the angular position of the one or more dispatching implements between crop rows including, but not limited to, straight line and curved crop rows. The controller 230 can cause the lateral position actuator 999 to alter the linear position of the one or more row units 108 to reduce a difference between the detected position and the crop intersection threshold. The lateral position actuator 999 controls the linear position of the one or more row units 108 between both straight line and curved crop rows.

Figure 4:
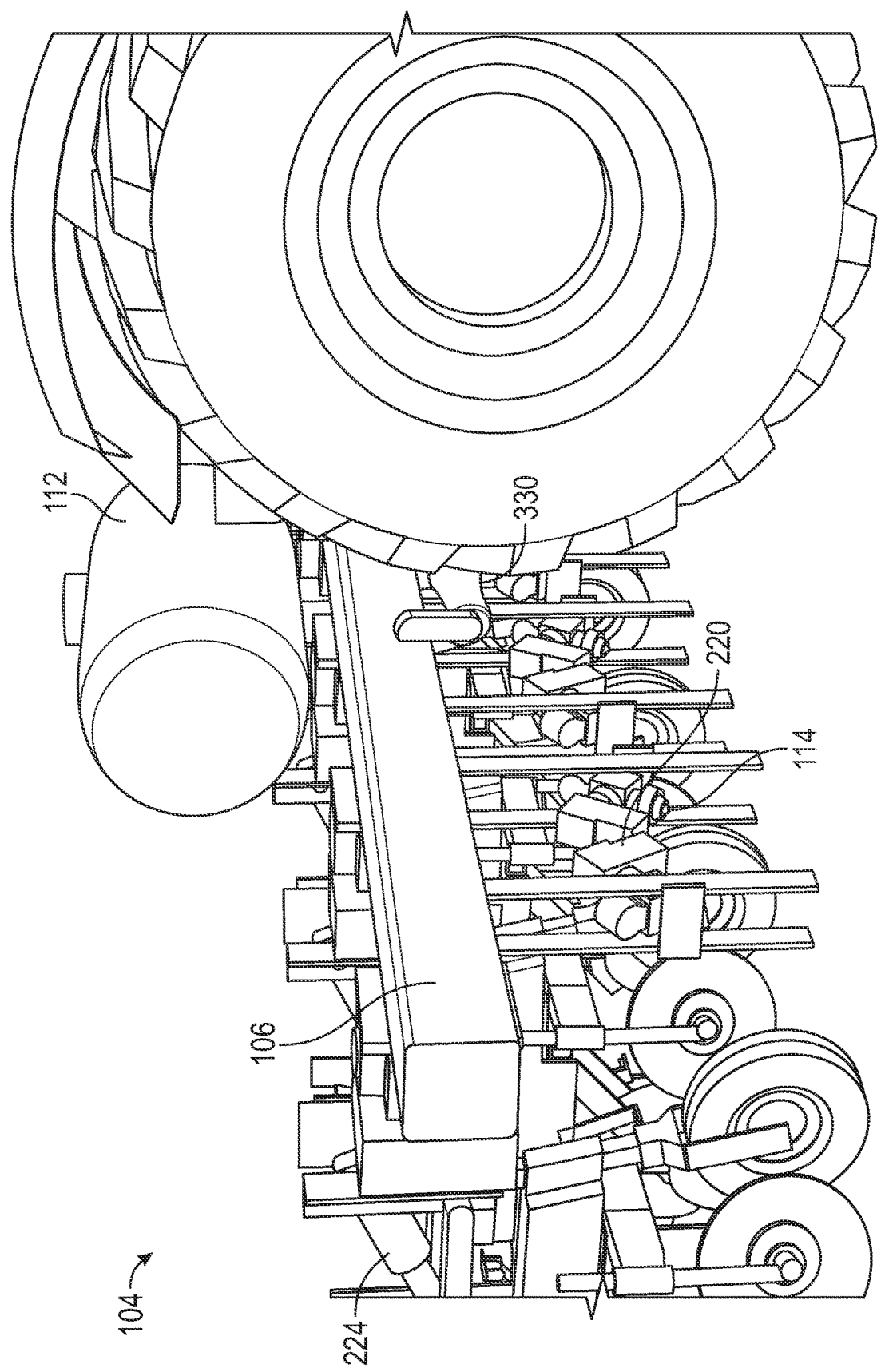
FIG. 4 is a perspective view of the agricultural system looking towards the implement from a rear portion of the vehicle.

FIG. 4 is a perspective view of the agricultural system looking towards the implement 104 from a rear portion of the vehicle (e.g., the mover 102). The implement support frame 106 is coupled between row units 108 and the mover 102. The implement support frame includes one or more bars or members to mechanically support the row units 108. The implement support frame 106 includes connection features to attach to a hitch assembly 330 of or coupled to the mover 102. The implement support frame 106 includes, in some examples, a pivot assembly 660 (see FIG. 5) attached thereto that allows for angular orientation (adjustment and maintenance) of row units 108. The implement support frame 106 can be configured to couple with an automated vehicle, vehicle frame, or the like. The implement 104 or implement support frame 106 can be coupled along the vehicle frame, within a vehicle frame socket, (e. U-shaped frame) or the like.

The hitch assembly 330 is coupled between the implement 104 and the mover 102. The hitch assembly 330, in some examples, includes a three-point assembly, ball hitch or the like. The hitch assembly 330, in some examples, is coupled to an array rotation actuator 770 (see FIG. 6) that controls an angle (e.g., maintains, adjusts, modulates or the like) of the implement support frame 106 relative to the mover 102 and accordingly controls the angles of the associated row units 108. The hitch assembly 330, in some examples is coupled to a lateral position actuator 999 (see FIG. 10) that alters a lateral position of the hitch assembly 330 relative to the implement support frame 106.

Figure 5:
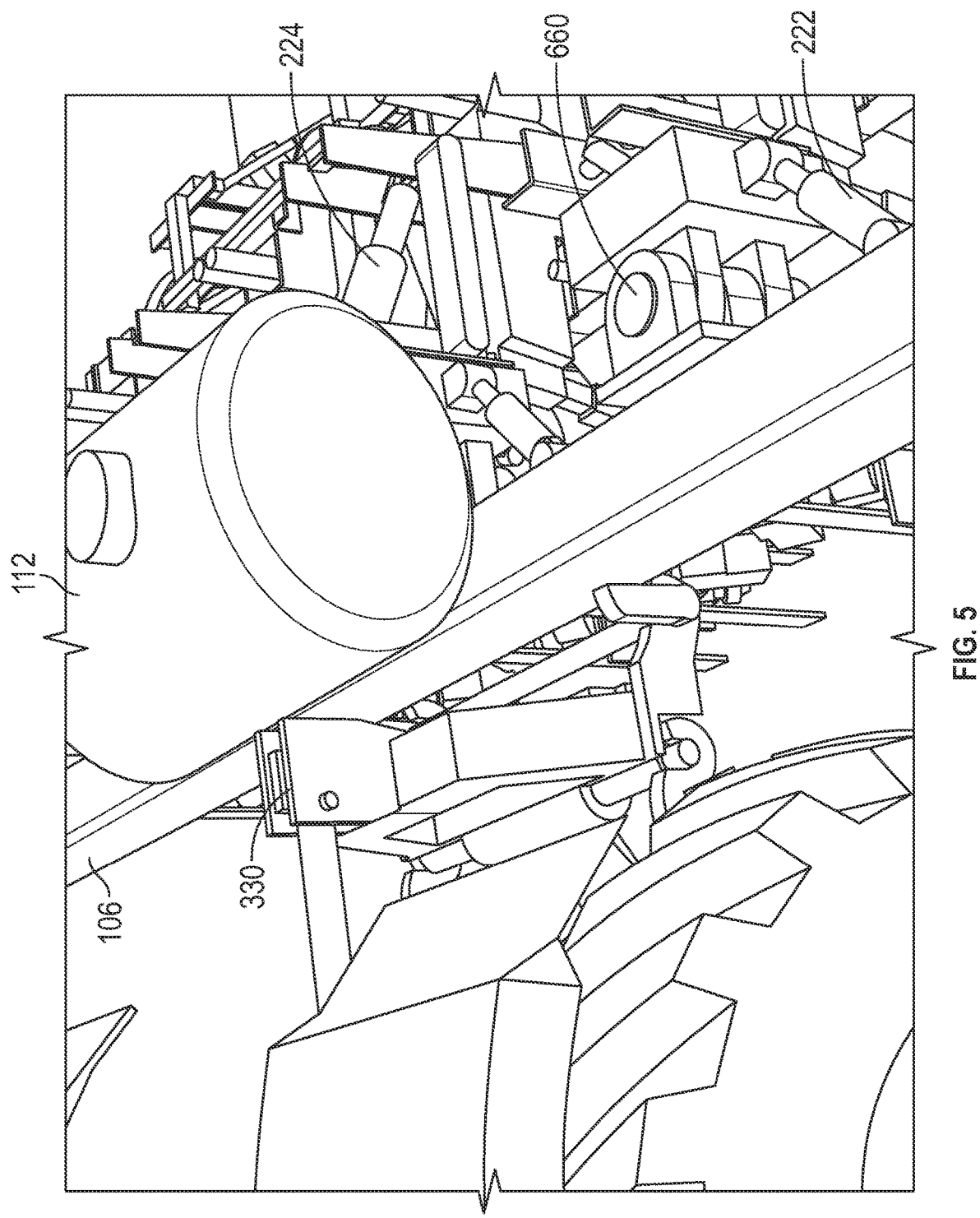
FIG. 5 is a perspective view of an agricultural implement looking down towards the hitch assembly and the portion of the implement.

FIG. 5 is a perspective view of an agricultural implement looking down towards the hitch assembly 330 and a portion of the implement 104. The elevation actuator 224 is electrically or communicatively coupled to the controller 230 (see FIG. 3). The controller 230 controls operation of the elevation actuator 224. The elevation actuator 224 is configured to raise and lower the cultivator shovel or other dispatching implement 110, such as to alter an elevation of the dispatching element 110 relative to the soil, including depth of the dispatching element 110 in the soil, disengagement of the element from the soil 110 (e.g., for transport or to minimize overrunning or the like).

The rotation actuator 222 is mechanically coupled between the implement support frame 106 and the pivot assembly 660. The rotation actuator 222 is electrically or communicatively coupled to the controller 230. The controller 230 controls operation of the rotation actuator 222, such as to control an orientation of the dispatching element 110 relative to the implement support frame 106.

The pivot assembly 660 is coupled between the row unit 108 and the implement support frame 106. The pivot assembly 660 can include a pin around which interdigitated flanges can rotate. The pivot assembly 660 allows for rotational adjustment of the row unit 108, such as by activation of the rotation actuator 222.

As discussed herein, the controller 230 in combination with the rotation actuator 222, elevation actuator or the like controls the dispatching element 110 orientation including maintenance of an angular orientation or elevation, adjustment of the angular orientation or elevation, or the like. As discussed herein, control of the dispatching element 110 as well as other movable components of the implement is conducted to provide dynamic orientation of the components, for instance as the implement conducts operations within a field relative to crop rows.

Figure 6:
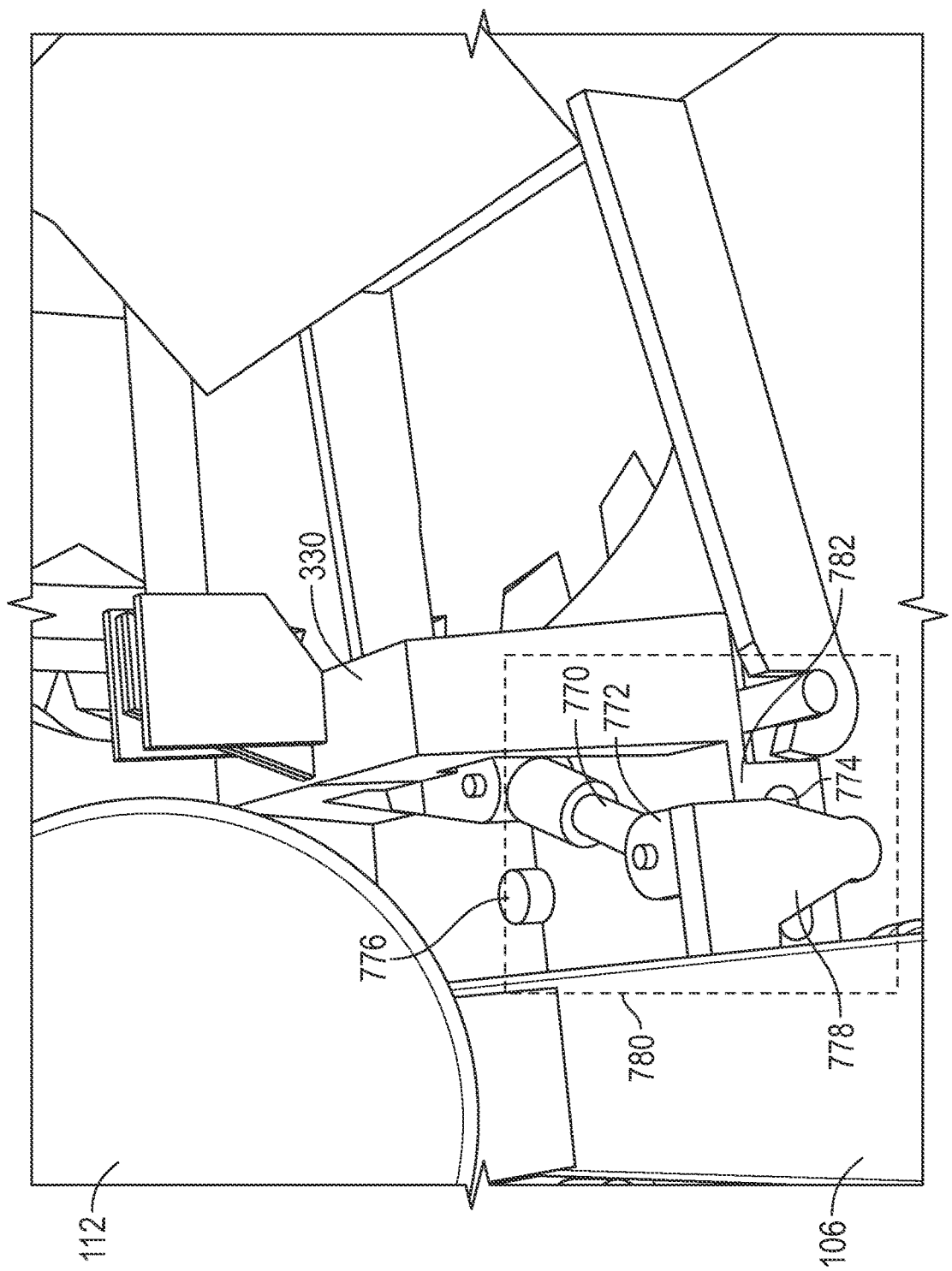
FIG. 6 is a perspective view of another hitch assembly that includes an angular displacement system.

FIG. 6 is a perspective view of an example of the hitch assembly 330 that includes an angular displacement system 780. FIG. 6 illustrates a close-up view of the hitch assembly 330 coupled with the angular displacement system 780. The angular displacement system 780 is mechanically coupled with the plurality of row units 108, for instance by way of the implement support frame 106. The angular displacement system 780 provides for rotation of the implement support frame 106 relative to the mover 102. The row units 108 and their dispatching elements 110 are coupled with the support frame 106, and the angular displacement system 780 concurrently controls angular position of the dispatching elements 110 relative to crop rows. The angular displacement system 780 comprises the array rotation actuator 770, pivot assembly 772 (e.g., a pivot or articulating joint for the actuator 770), grooved housing 782, support block 778, and king pin 776.

The array rotation actuator 770 is coupled between the hitch assembly 330 and the implement 104, for instance the support frame 106. The array rotation actuator 770, when actuated, provides concurrent angular adjustment of the support frame 106 and the row units 108 relative to the mover 102. The array rotation actuator 770 angularly adjusts the angle between the implement support frame 106 and the mover 102. The array rotation actuator 770 is electrically or communicatively coupled to the controller 230. The array rotation actuator 770 is similar to the rotation actuator 222 but the array rotation actuator 770 controls an angle orientation of the support frame 106 relative to the mover 102 while the row unit rotation actuator 222 alters the angle of orientation of an associated row unit 108 and its dispatching element 110 relative to the support frame 106. Also, the array rotation actuator 770 is coupled between the hitch assembly 330 and the implement support frame 106, while the unit rotation actuator 222 is coupled between the implement support frame 106 and the row unit 108.

The pivot assembly 772 is in a support block 778 of the angular displacement system 780. The pivot assembly 772 is coupled between the implement support frame 106 and the hitch assembly 330. The pivot assembly 772 provides mechanical coupling while still allowing for rotation of the implement 104 relative to the mover 102. The pivot assembly 772 coupled to the array rotation actuator 770 is similar to the pivot assembly 660 coupled to the row unit rotation actuator 222.

The pivot assembly 772, king pin 776, and support block 778 are in this example coupled to the grooved housing 782. The grooved housing 782 includes at least one groove 774 therethrough. The grove 774 can extend entirely through the housing 782. The groove 774 in the housing 782 provides a degree of freedom for the implement 104 to move rotationally, or laterally) relative to the hitch assembly 330. The groove 774 guides and constrains movement of the implement 104, for instance during manipulation of the implement 104 relative to crops, crop rows or the like.

A king pin 776 is coupled in the housing 782 and provides a pivot axis for to permit the rotation actuator 770 to rotate the implement 104 and the associated row units 108 and dispatching elements 110. The king pin 776 of the angular displacement system 780 allows the implement 104 to rotate relative to the hitch assembly 330, for instance with actuation of the rotation actuator 770. The king pin 776 in an example includes a pin mechanically coupled between the hitch assembly 330 and the implement 104. Optionally the king floats between the hitch assembly 330 and the implement 104 (e.g., is held in place with cotter pins or similar).

The support block 778 of the angular displacement system 780 is coupled between the implement support frame 106 and the pivot assembly 772. In one example, the support block is affixed to the implement support frame 106 (e.g., welded, bolted or the like) The support block 778 couples the hitch assembly 330 to the implement 104 through the rotation actuator 770 and the pivot assembly 772.

Figure 7:
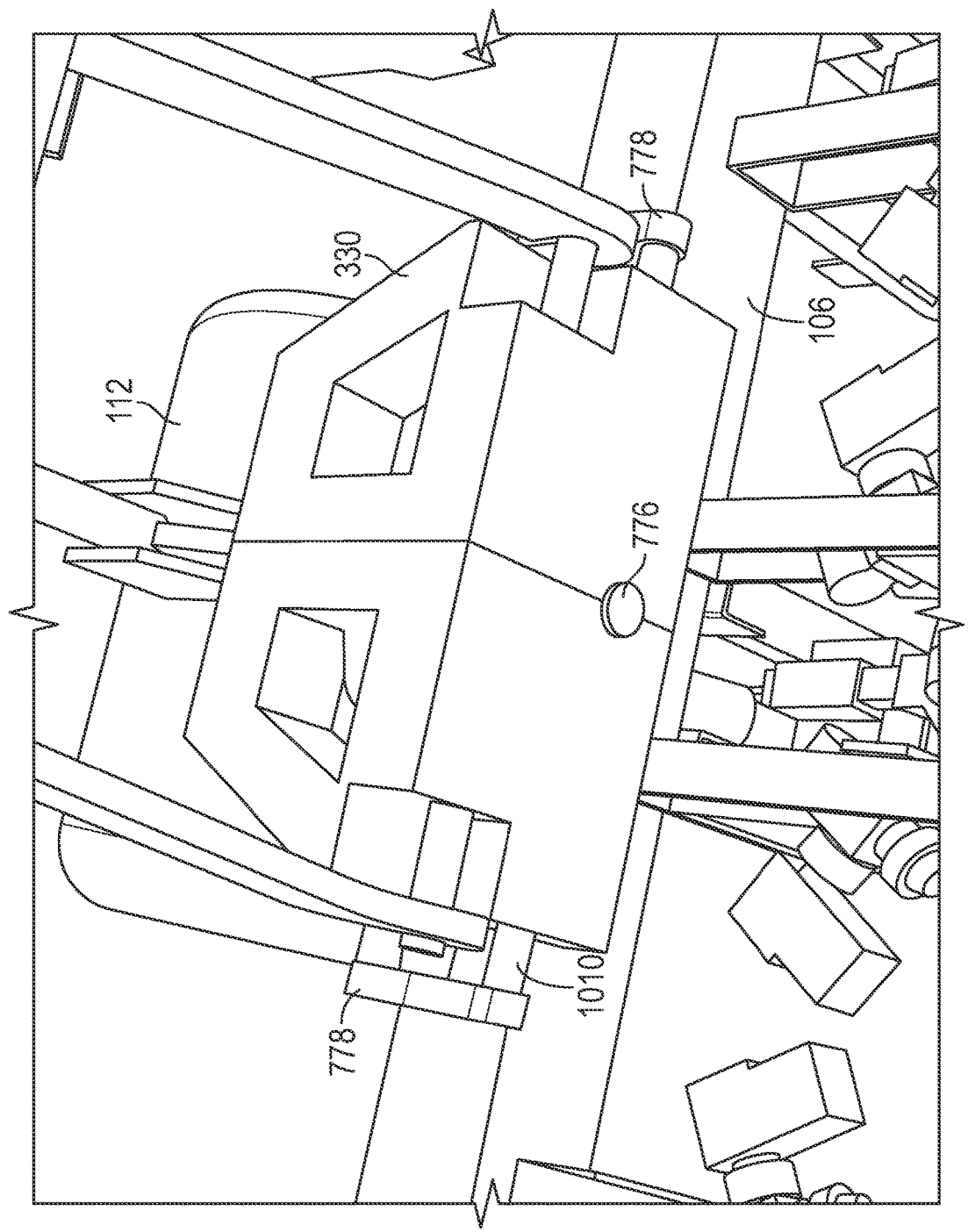
FIG. 7 is a perspective view of the hitch assembly of FIG. 6 looking up towards the hitch assembly from under the hitch assembly.

FIG. 7 is a perspective view of the angular displacement system 780 of FIG. 6 looking up towards the angular displacement system 780 from underneath. The view of FIG. 7 shows a slider support 1010 extending through the groove 774 (see FIG. 6). The slider support 1010 includes a bar or other mechanism over which the implement 104 can move laterally or rotate relative to the hitch assembly 330 in or about the groove 774. The slider support 1010 is coupled between opposing support blocks 778. The slider support 1010 is coupled with the king pin 776 providing controlled rotation about the king pin 776.

As previously discussed, the support blocks 778 are coupled between the implement support frame 106 and the pivot assembly 772. The support blocks 778 are on opposite sides of the housing 782. The support blocks 778 couple the hitch assembly 330 to the implement 104.

Figure 8:
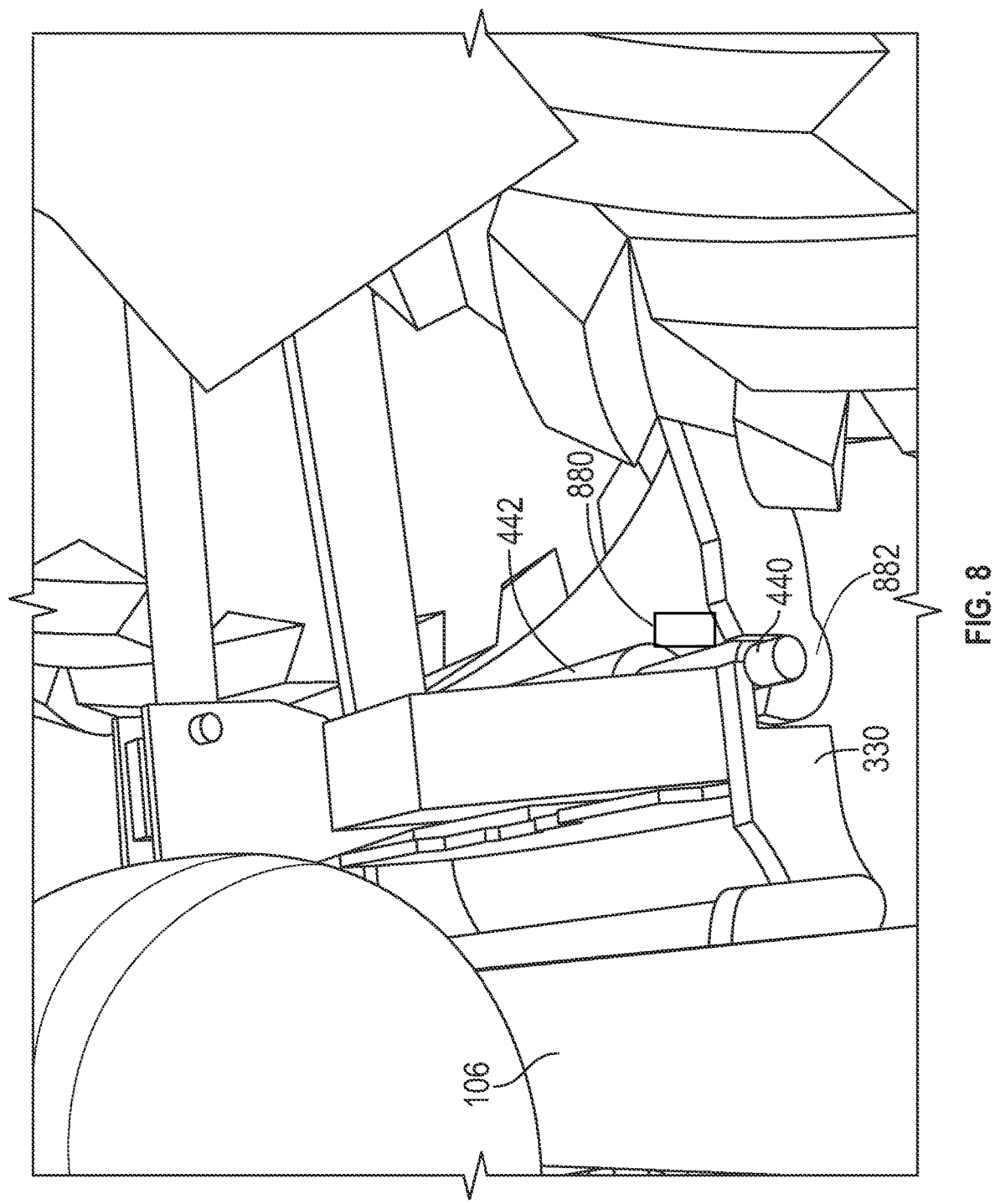
FIG. 8 is a perspective view of an example of a hitch assembly that couples the agricultural implement to the vehicle.
Figure 9:
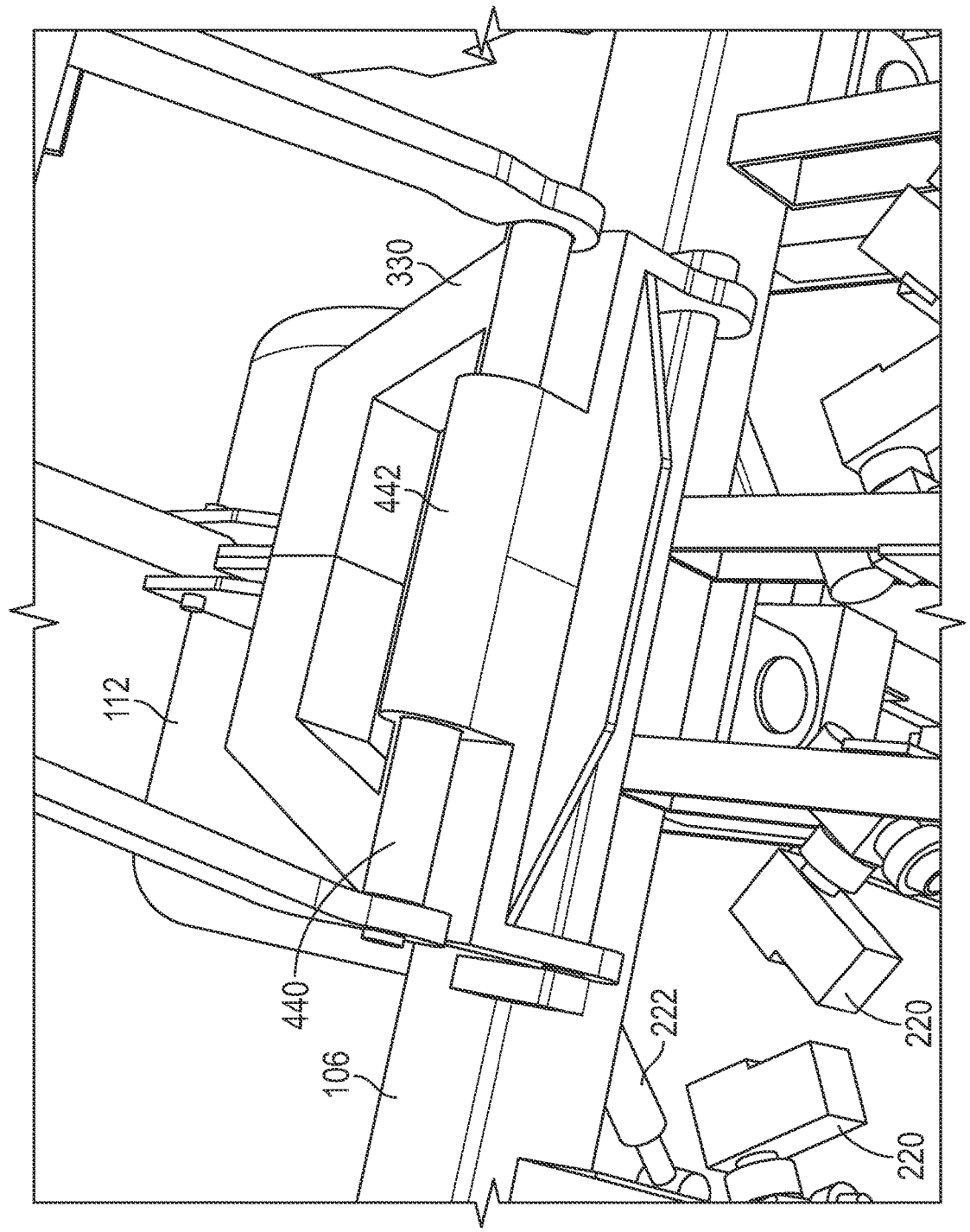
FIG. 9 is a perspective view of an agricultural implement looking up towards the hitch assembly and a portion of the implement.

FIG. 8 is a perspective view of an example of a hitch assembly 330 that couples the agricultural implement 104 to the mover 102. FIG. 8 shows a close-up view of the hitch assembly 330. FIG. 9 is another view of the hitch assembly 330 that further shows a pin 440 and sleeve 442. As discussed, the hitch assembly 330 can include a pin 440 in a sleeve 442. The motion of the pin 440 concurrently adjusts the lateral position of the row units 108 relative to the mover 102. The pin 440 is coupled with hitch assembly receiver 882, the sleeve 442 is coupled with the pin 440. Movement of the pin 440 relative to the sleeve 442 accordingly laterally moves the implement 104 (including the row units 108 and associated dispatching elements 110) relative to the hitch assembly 330. For example, the motion of the pin 440 correspondingly translates the implement support frame 106 coupled with the sleeve 442 along the pin 440. An actuator 880 is coupled between the pin 440 and the sleeve 442. The actuator 880 moves the sleeve 442 relative to the pin 440, and includes, but is not limited to, a worm drive, rack and pinion actuator, hydraulic cylinder or the like.

FIG. 9 is a perspective view of the agricultural implement 10 looking up towards the hitch assembly 330 and a portion of the implement 104 from under the hitch assembly 330. FIG. 9 shows a close-up view of the hitch assembly 330 of FIG. 8 from under the hitch assembly 330. The view in FIG. 9 shows opposing sides of the pin 440 and the sleeve 442.

Figure 10:
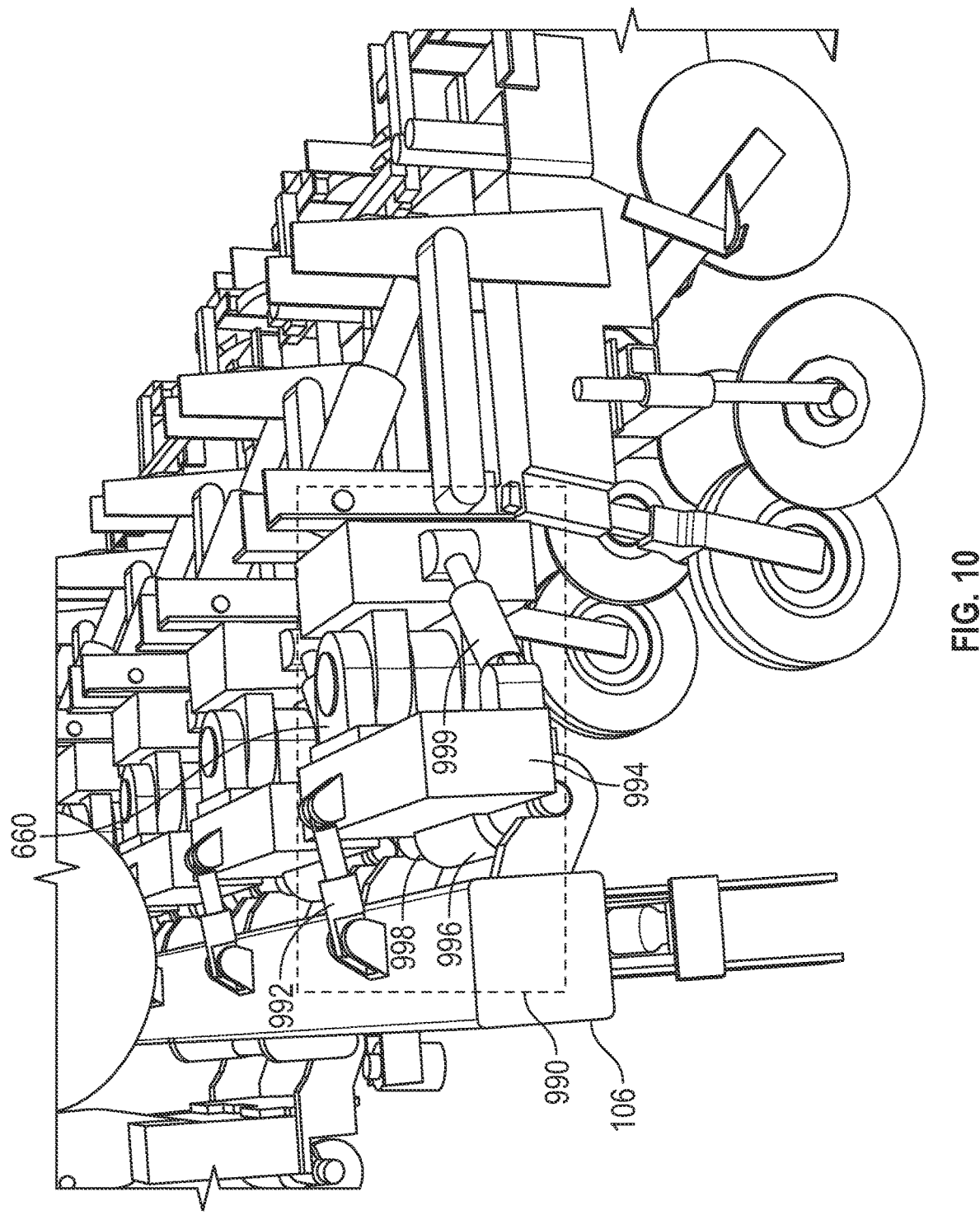
FIG. 10 is a perspective view of an agricultural implement that includes a lateral displacement system.

FIG. 10 is a perspective view of an agricultural implement 104 that includes a lateral displacement system 990. The lateral displacement system 990 is coupled between the row unit 108 and the implement support frame 106. The lateral displacement system 990 alters a longitudinal position of one or more row units 108 associated with the system 990 and coupled along the implement support frame 106. The lateral displacement system 990 as illustrated includes a linear position actuator 999 configured to control lateral movement of the associated row units relative to the remainder of the implement. The linear position actuator 999 (e.g., a hydraulic cylinder or the like) is coupled between the row unit 108 and a support frame 994. The support frame 994 is coupled with the implement support frame 106. The support frame 994 is coupled between the implement support frame 106 and the row unit 108. The support frame 994 provides mechanical support for the pivot assembly 660, the mechanical knuckle 992, and the linear position actuator 999. The support frame 994 includes a support frame sleeve 996 through which a support frame pin 998 can be situated allowing the support frame 994 to slide laterally. The support frame sleeve 996 allows the lateral displacement system 990 to translate along the support frame pin 998 and move the row unit 108 laterally along the implement support frame 106. The support frame pin 998 is coupled with the implement support frame 106 and a support frame sleeve 996 is coupled with the row unit 108 (directly or indirectly). The sleeve 996 is configured to permit lateral movement of the row unit 108 relative to the pin 998 while constraining one or more of rotation or longitudinal movement of the row unit through actuation of the linear position actuator 999. In the example shown in FIG. 10 the pivot assembly 660 further includes a mechanical knuckle 992 coupled between the implement support frame 106 and a row unit support frame 994. The mechanical knuckle 992 constrains rotation of the row unit 108 relative to the support frame pin 998 (e.g., with the pin otherwise acting as a rotation axis) while at the same time permitting the linear position actuator 999 to control the lateral position of the row unit 108 relative to the support fame 106.

Figure 11:
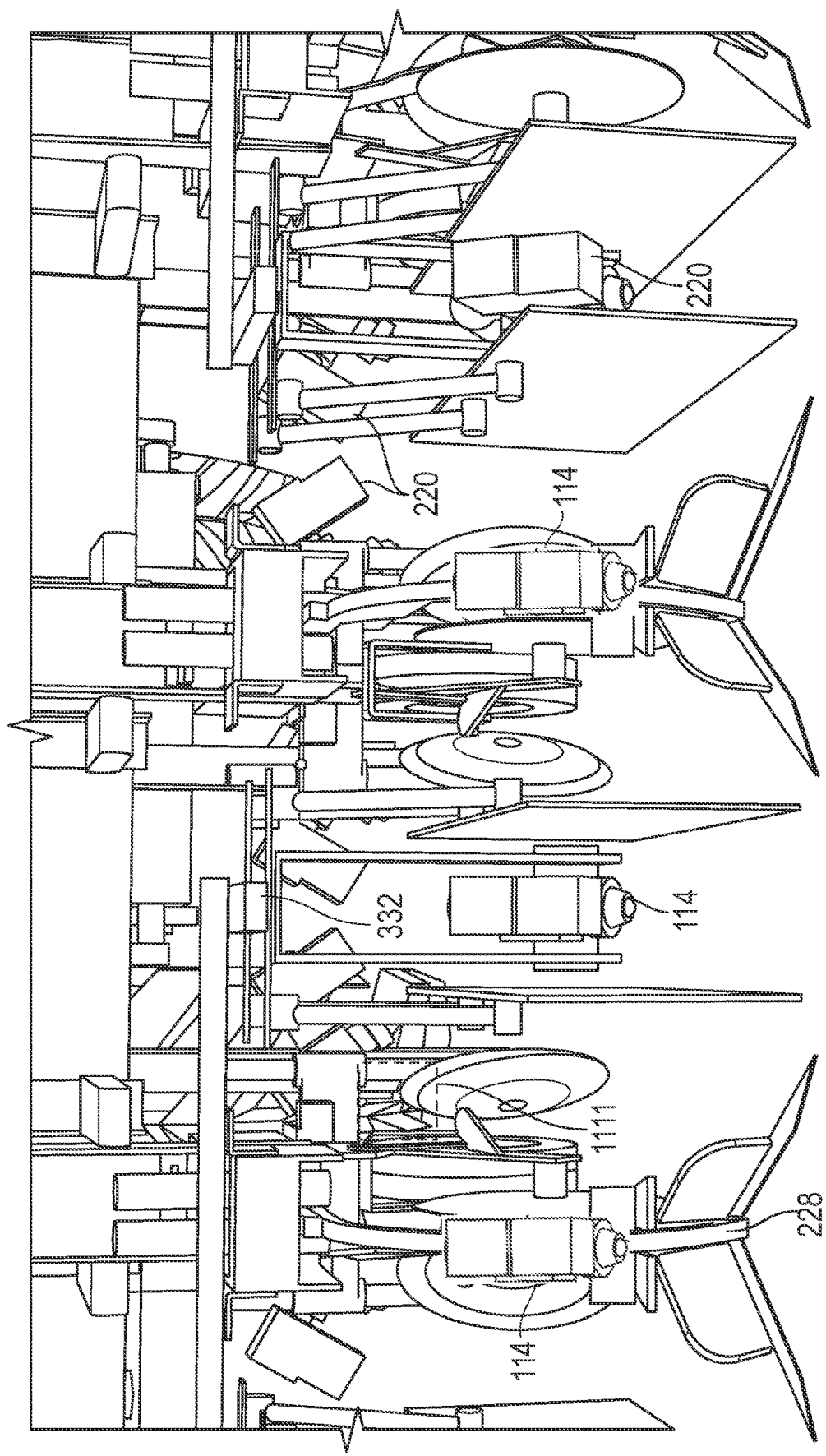
FIG. 11 is a perspective view of the agricultural implement that provides a close-up view of the row units and components between the row units.

FIG. 11 is a perspective view of the agricultural implement 104. The view of FIG. 11 provides a close-up view of the row units 108 and components between the row units 108. FIG. 11 provides a view of the implement 104 from near ground level looking towards the dispatching implement 110 (e.g., cultivator shovel in the example of FIG. 11).

The spray assembly 114, in some examples, includes electrostatic or fluid mechanical spray nozzles to spray weeds. In some examples, the spray assembly 114 is used to spray fertilizer by the crop. In some examples, the spray assembly 114 is used to spray insecticide on the crop. The spray assembly 114, in some examples, includes a fluid nozzle actuator 1222 (see FIG. 3) communicatively coupled to a fluid nozzle. The fluid nozzle actuator 1222 is electrically or communicatively coupled to the controller 230. The fluid nozzle actuator 1222 manages fluid flow through the fluid nozzle. The controller 230, in some examples, causes the fluid nozzle actuator 1222 to open the fluid nozzle in response to detecting a plant (e.g., weed or crop) and closes the flow valve in response to failure to detect the plant (e.g., weed or crop).

The sensor 220, in some examples, includes mechanical feelers oriented at a specified height. In response to contact with the mechanical feeler, a signal can be provided to the controller 230. In some examples, the sensor 220 can provide data used to detect whether a bug (e.g., insect) is present. The controller 230 can activate the spray assembly 114 to provide insecticide in response to detecting the bug.

The spray assembly 114 is situated, for example, between crop shields 126, on the implement support frame 106, on the row unit 108, or on the implement support frame 128. FIG. 11 includes a view of the spray assembly 114 on the implement support frame 128 and coupled to the shield bracket 332. The spray assembly 114 attached to the implement support frame 106 provides fluid that contacts the crops, flora, or other part of the field before the dispatching implement 110 coupled to the row unit 108. The spray assembly 114 attached to the dispatching implement support frame 128 provides fluid that contacts the crops, flora, or other part of the field after the dispatching element 110. A residual herbicide can be added to topsoil to prevent germination of weeds or other unwanted flora. The residual herbicide can be provided in the crop row by the spray assembly 114 coupled to the implement support frame 106. The residual herbicide can be provided in between and behind the crop rows using the spray assembly 114 coupled to the implement support frame 128 or the shield bracket 332. Sometime the residuals are incorporated in the soil. To accommodate this, the spray assembly 114 coupled to the implement support frame 106 sprays in front of a cultivator shovel that mixes the herbicide into the soil if the residual herbicide is to be left on the topsoil, the herbicide is provided using the spray assembly 114 coupled to the implement support frame 128 or the shield bracket 332.

A laser 1111 can be oriented to kill undesired flora in or between the crop rows. The laser 1111 can be powered by the electrical power supply (shown in FIGS. 12 and 13). The laser 1111 can be electrically or communicatively coupled to the controller 230. The controller 230, after determining there is undesired flora in the crop row (e.g., based on data from the crop characteristic sensor 220), can activate the laser 1111 to kill the undesired flora. The laser 1111 can be coupled to a row unit support frame 120, the implement support frame 106, between crop shields 126, the dispatching element support frame 228, or the like.

The laser 1111 can be oriented by the row unit rotation actuator 222, the elevation actuator 224, the array rotation actuator 770, the lateral position actuator 999, or another actuator. The laser 1111 can be pointed at the flora to be dispatched by the laser 1111.

Figure 12:
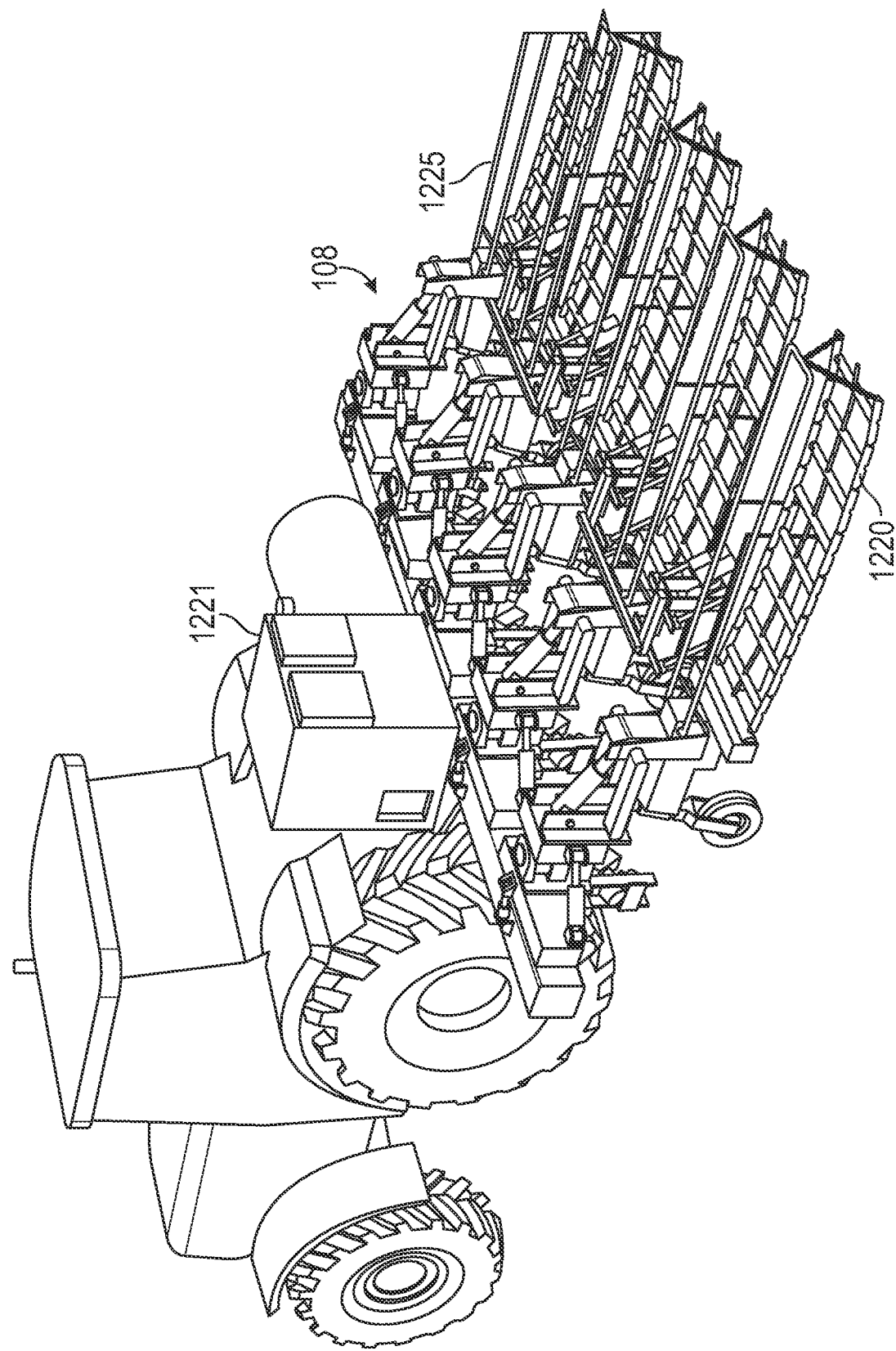
FIG. 12 is a perspective view diagram of an agricultural implement that includes an electrostatic implement for killing undesired flora.

FIG. 12 is a perspective view diagram of an agricultural implement that includes an electrostatic implement 1220 for killing undesired flora. The dispatching implement, in the example of FIG. 12, is an electrostatic implement 1220. The electrostatic implement 1220 dispatches weeds or other flora using electrical power (e.g., provided by the electrical supply 1221). While the electrostatic implement 1220 is illustrated in the form of a grid, other configurations are possible. The electrostatic implement 1220 is used in place of a cultivator shovel or laser 1111 (see FIG. 11 or 13). The electrostatic implement 1220 is raised or lowered by the elevation actuator 224. A longitudinal position of the electrostatic implement 1220 can be adjusted by a linear position actuator 999. An angular position of the electrostatic implement 1220 relative to the support frame 106 can be adjusted using the rotation actuator 222. The electrostatic implement 1220 can be mechanically coupled to a support frame 1225.

An electrical supply 1221 can provide electrical power to the electrostatic implement 1220 and/or other electrically operated components of the implement 104. The electrical supply 1221 can include a generator.

An electrostatic implement support frame 1225 is coupled to the electrostatic implement 1220 and the row unit 108. The electrostatic implement support frame 1225 provides mechanical support and constrains movement of the electrostatic implement 1220. The support frame 1225 can help prevent the electrostatic implement 1220 from wandering into crop and retain the electrostatic implement 1220 in a desired configuration. The electrostatic implement support frame 1225 can include members extending away from the row units 108.

Figure 13:
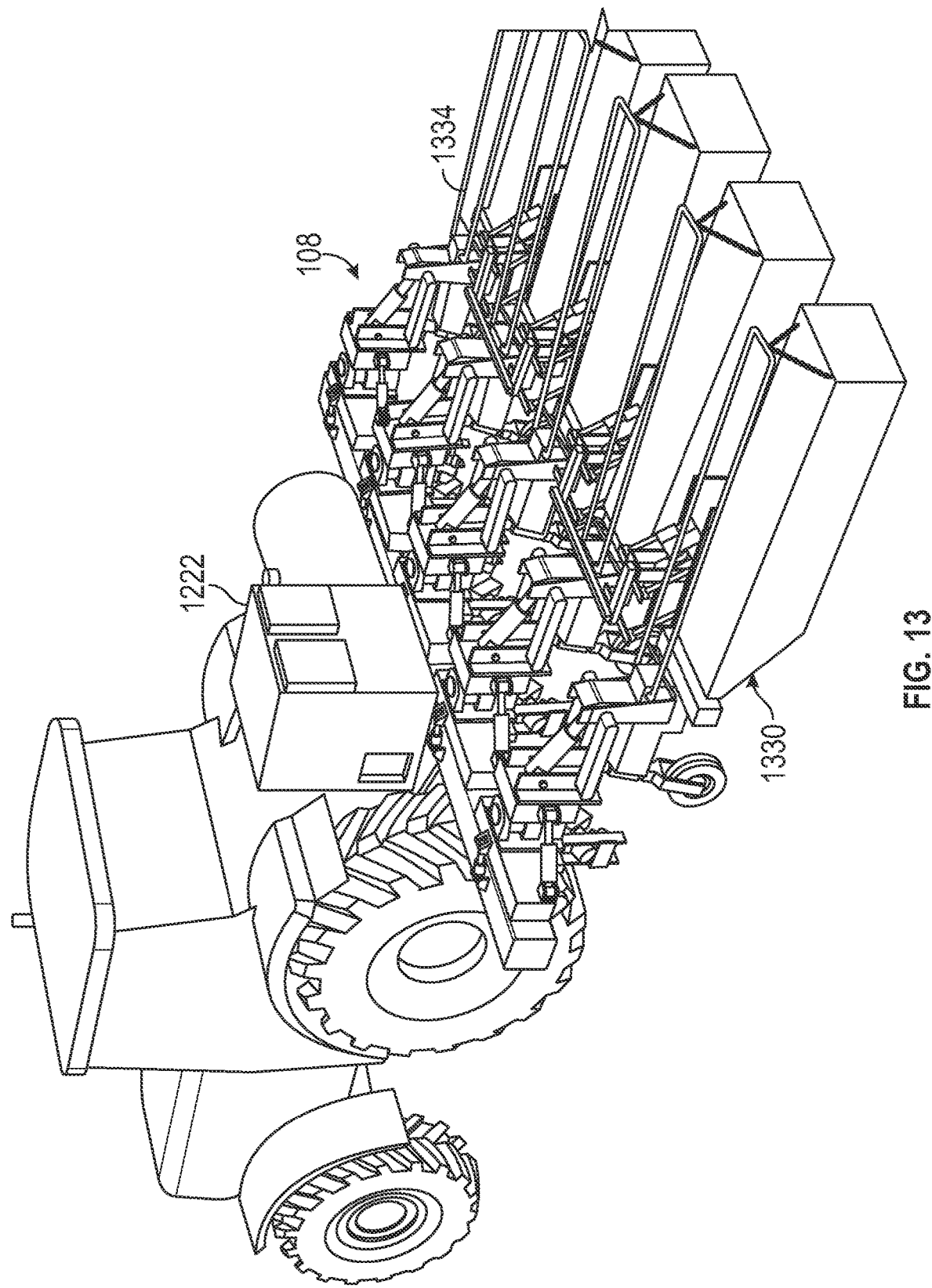
FIG. 13 is a perspective view diagram of an agricultural implement that includes a laser implement for killing undesired flora in or between crop rows.

FIG. 13 is a perspective view diagram of an agricultural implement that includes a laser implement 1330 for killing undesired flora in or between crop rows. The dispatching implement is a laser implement 1330 in the example of FIG. 13. The laser implement 1330 dispatches weeds or other flora using optical power. The laser implement 1330 can be used in place of, or in conjunction with, the cultivator shovel or other dispatching element 110. The laser implement 1330 can be raised or lowered by the elevation actuator 224. A longitudinal position of the laser implement 1330 can be adjusted by a linear position actuator 999. An angular position of the laser implement 1330 relative to the support frame 106 can be adjusted using the rotation actuator 222. The laser implement 1330 can be mechanically coupled to the support frame 1225.

An electrical supply 1221 provides electrical power to the laser implement 1330 and/or other electrically operated components of the implement 104. The electrical supply 1221 can include a generator.

A laser implement support frame 1334 can be mechanically coupled between the row unit 108 and the laser implement 1330. The laser implement support frame 1334 provides mechanical support and constrains movement of the laser implement 1330. The support frame 1334 can help prevent the laser implement 1330 from wandering into crop and retain the laser implement 1330 in a desired configuration. The laser implement support frame 1334 can include members extending from the row units 108 from which laser shrouds are hung.

Figure 14:
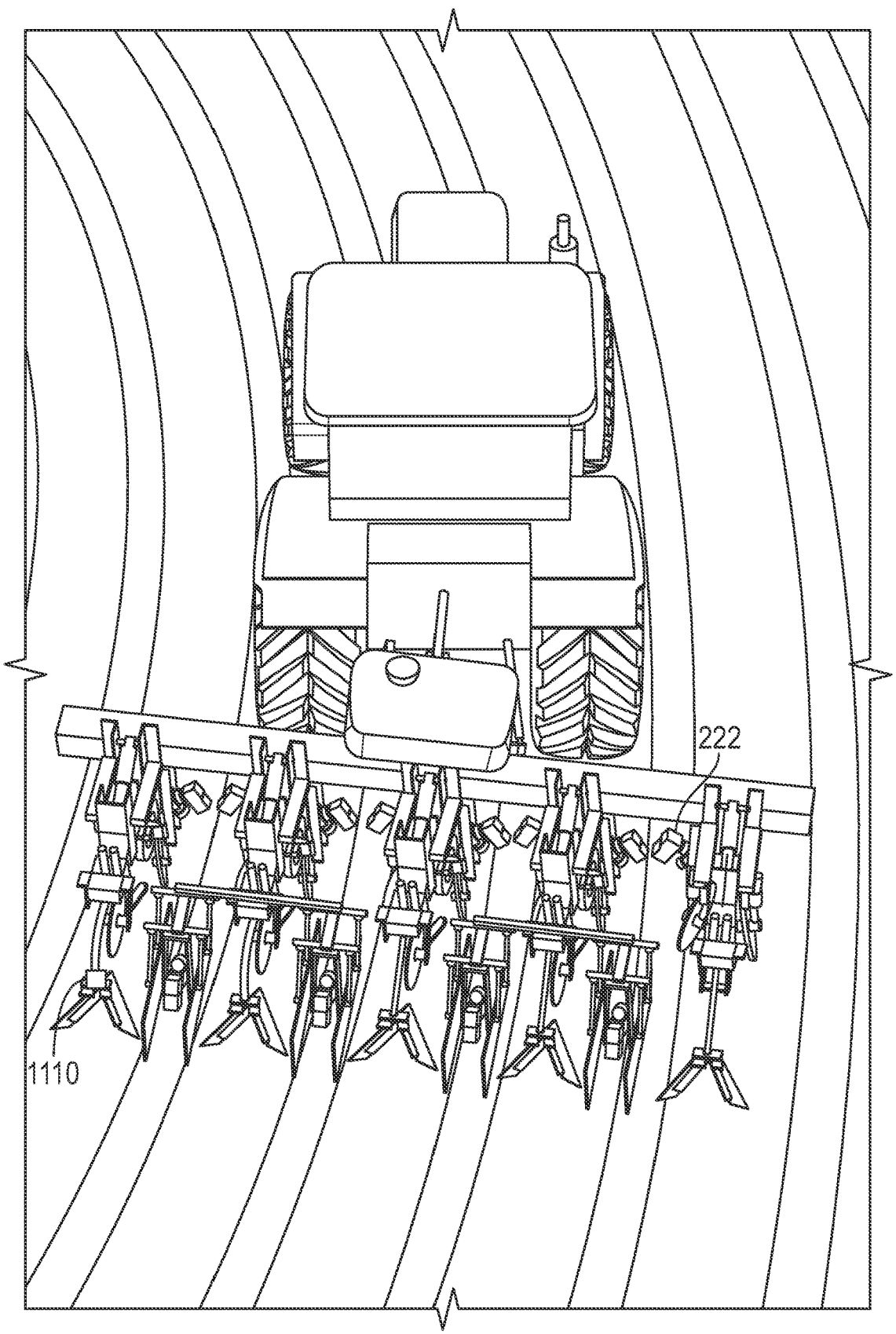
FIG. 14 is a perspective view of an agricultural system including an agricultural vehicle and one example of an agricultural implement in a field illustrating how the implement manages to navigate through curved rows of crops.

FIG. 14 is a perspective view of an agricultural system including an agricultural vehicle and one example of an agricultural implement in a field illustrating the implement and control of the implement (e.g., orientation, articulation, or the like) to navigate through curved rows of crops. In this example, a load sensor 1110 is coupled to the implement. The load sensor 1110 is configured to determine a load on the cultivator shovel or another dispatching implement 110. The controller 230, in some examples causes the dispatching implement actuator 224 to lift the dispatching implement 110 in response to a determined load greater than a specified fouling threshold. The controller 230, in some examples, lowers the dispatching implement 110 after a specified period.

The agricultural implement of FIG. 14 can be any of the implements discussed herein and their equivalents. As discussed herein, the system of FIG. 14 is configured to orient the implements including the orientation of row units, dispatching elements collectively or discretely for navigation through crop rows including crop rows having curved profiles, turns, grading or the like. For instance, even with curved rows, the present system controls the orientation of dispatching elements accurately position and navigate the elements between the crop rows.

Any of the row unit rotation actuator 222, the elevation actuator 224, the array rotation actuator 770, lateral position actuator 999, or the like, are operated by the controller 230 to control the orientation of the row units 108 (in one or more degrees of freedom). Any of the row unit rotation actuator 222, the elevation actuator 224, the array rotation actuator 770, lateral position actuator 999, or the like can include a piston and cylinder assembly. The rotation actuator 222 and/or lateral position actuator 999 can be coupled at one or more of the dispatching implement 110, the row unit support frame 120, the implement support frame 106, or the hitch assembly 330, such as to control the orientation or position of one or more of the dispatching implements 110 relative to the crop. Optionally, these actuators control a plurality of degrees of freedom including rotation (or pivoting), lateral movement, elevation or the like of the row units includes the dispatching implements 110, crop shields 126 or the like.

Figure 15:
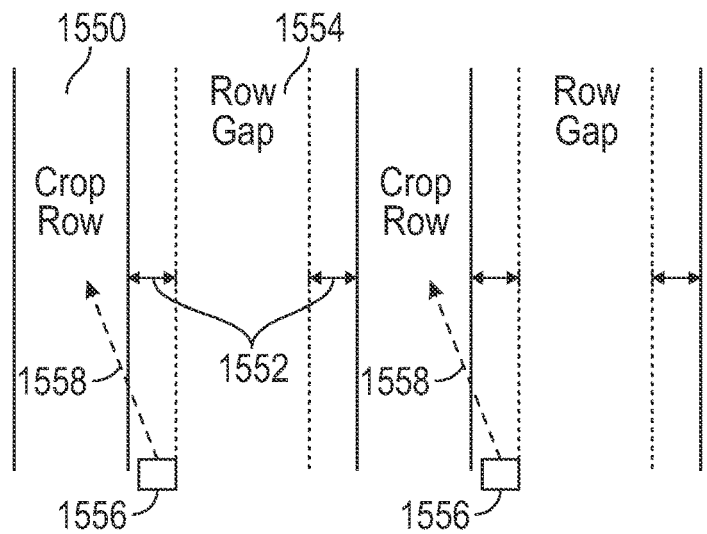
FIG. 15 illustrates how a dispatching implement can interfere with a straight crop row.

FIG. 15 illustrates how a dispatching implement can interfere with a crop row. FIG. 15 illustrates how a dispatching implement 1556 (e.g., the cultivator shovel, the laser implement 1330, the electrostatic implement 1220, or the like) can interfere with a crop row 1550. Arrow 1558 represents motion of the dispatching implement 1556, for instance initiated with steering of a mover to maintain the mover ground engaging elements (e.g., wheels) between crop rows while steering along a forthcoming curve in the crop rows. A crop intersection threshold 1552 represents a specified distance (e.g., a minimum border or offset) between the crop row 1550 and the dispatching implement 1556. The controller 230 discussed herein operates one or more of the actuators (also described herein) to orient the dispatching implement 1556 (or implements if the actuator is coupled with multiple implements), such as by adjusting the elevation, lateral position, or angular orientation relative to the support frame 106. The controlled orientation of the dispatching implement 1556 (e.g., with the controller 230) positions the dispatching implement within the row gap 1554 (a space between crop rows 1550) and maintains at least the crop intersection threshold 1552 between the crop row 1550 and the near edge of the dispatching implement 1556. Implement 104/row unit 108 manipulation minimizes (e.g., decreases or eliminates) intersection of the dispatching implement 1556 (or implements) with proximate crop or intrusion into the crop intersection threshold 1552. The crop rows 1550 can be detected by the sensor 220. The sensor 220 can provide data indicative of the crop rows 1550 to the controller 230. The sensor 220 senses the crops, the controller 230 indexes the threshold 1552 to the crops, and the sensor 220 can observe the implements 110 to use feedback control with the controller to orient the implements 110 to prevent intersection with crops and crossing of the threshold 1552.

Figure 16:
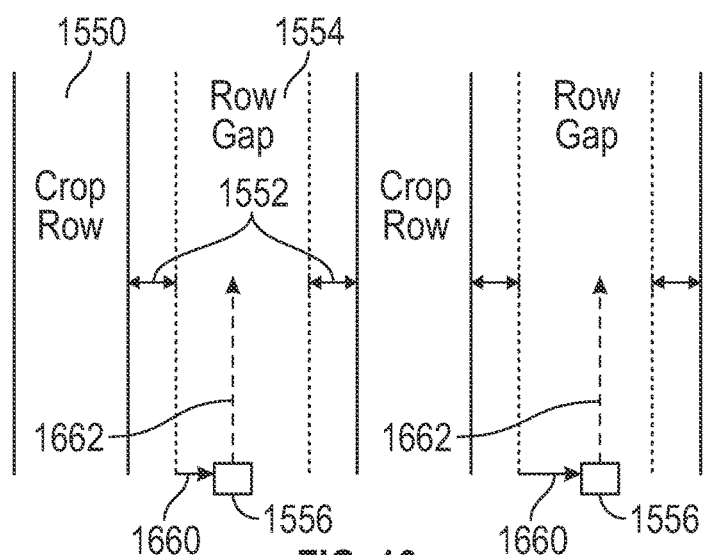
FIG. 16 illustrates how an agricultural implement can manipulate the dispatching implement by adjusting a linear position of the dispatching implement to avoid interference with the crop row.
Figure 17:
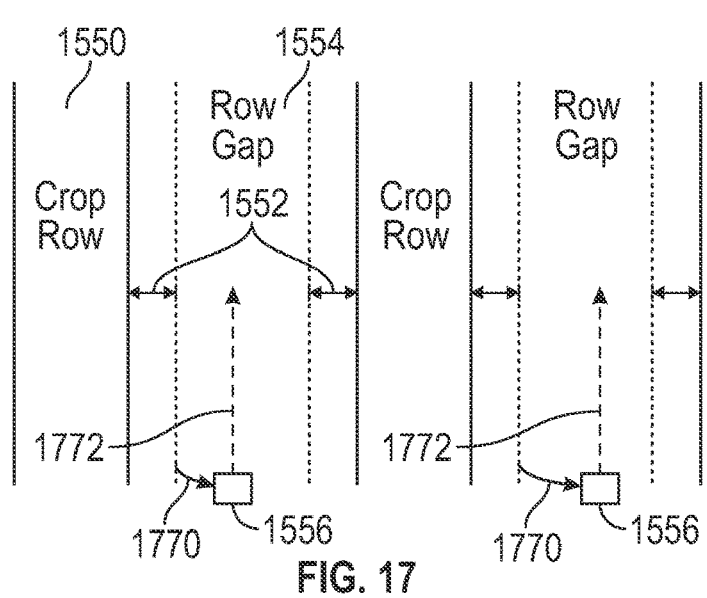
FIG. 17 illustrates how an agricultural implement can manipulate the dispatching implement by adjusting an angular position of the dispatching implement to avoid interference with the crop row.

FIG. 16 illustrates how an agricultural implement can manipulate the dispatching implement by adjusting a linear position of the dispatching implement to avoid interference with the crop row. FIG. 1 illustrates the elevation of the dispatching implement, while FIGS. 16 and 17 illustrate linear displacement and angular displacement of the dispatching implement 1556, respectively. Arrow 1660 indicates the linear adjustment of the dispatching implement 1556. The linear position actuator 999 situated at the row unit 108 or the hitch assembly 330, for example, linearly adjusts the dispatching element 1556. Arrow 1662 indicates movement of the dispatching implement 1556 after linear displacement of the dispatching implement 1556.

FIG. 17 illustrates how an agricultural implement can manipulate the dispatching implement by adjusting an angular position of the dispatching implement to avoid interference with the crop row. Arrow 1770 indicates the angular adjustment of the dispatching implement 1556. Arrow 1772 represents motion of the dispatching implement 1556. The angular adjustment is provided by the row unit rotation actuator 222, or the array rotation actuator 770. FIGS. 15, 16, and 17 show linear (straight) crop rows. Arrow 2022 indicates the movement of the dispatching implement 1556 after angular adjustment of the dispatching implement 1556.

Figure 18:
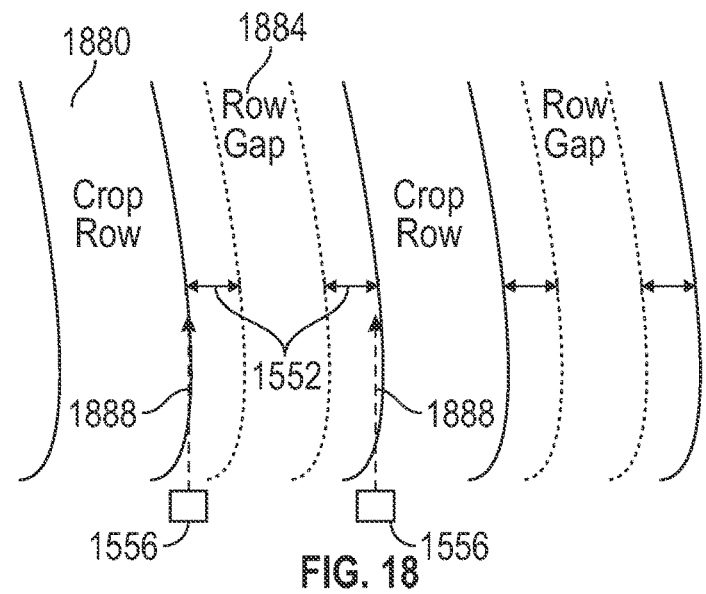
FIG. 18 illustrates how a dispatching implement can interfere with a curved crop row.

FIG. 18 illustrates how a dispatching implement 110 can interfere with a curved crop row. FIG. 18 illustrates how a dispatching implement 1556 (e.g., the cultivator shovel, the laser implement 1330, the electrostatic implement 1220, or the like) can interfere with a crop row 1880. Arrow 1888 represents motion of the dispatching implement 1556. A crop intersection threshold 1552 defines a distance between the crop row 1550 and the dispatching implement 1556. The controller 230 causes an actuator to manipulate the dispatching implement 1556, such as by adjusting the elevation, longitudinal position, or angular orientation relative to the support frame 106. The manipulation causes the dispatching implement 1556 to be oriented in row gap 1884 (a space between crop rows 1880) and at least a crop intersection threshold 1552 away from the crop row 1550. Implement 104/row unit 108 manipulation can minimize (e.g., decrease or eliminate) intersection between the dispatching implement 1556 and the intersection threshold 1552 or position the implement 104/row unit 108 away from intersection.

Figure 19:
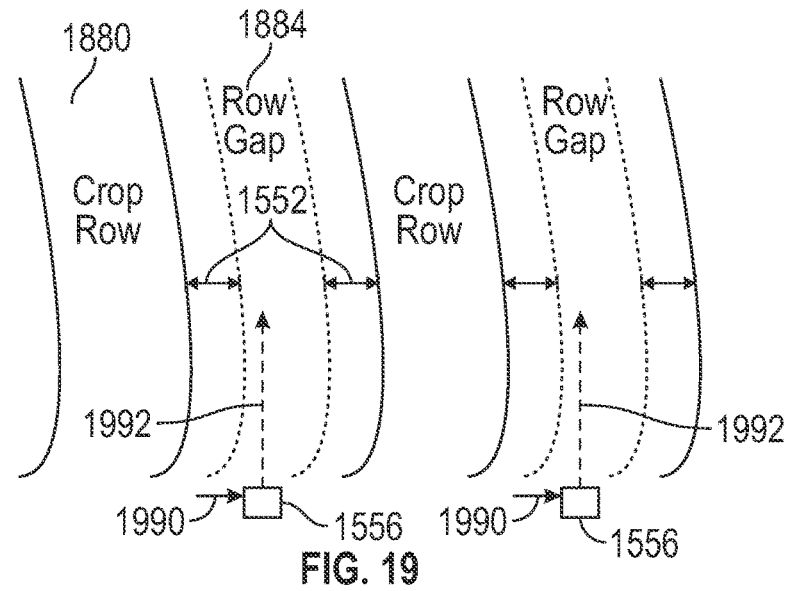
FIG. 19 illustrates how an agricultural implement can manipulate the dispatching implement by adjusting a linear position of the dispatching implement to avoid interference with the curved crop row.
Figure 20:
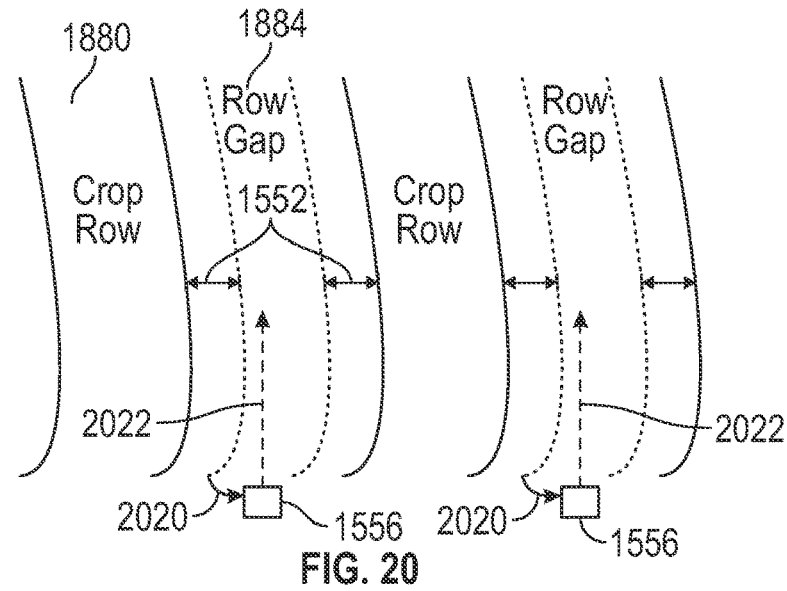
FIG. 20 illustrates how an agricultural implement can manipulate the dispatching implement by adjusting an angular position of the dispatching implement to avoid interference with the curved crop row.

FIG. 19 illustrates how an agricultural implement can manipulate the dispatching implement by adjusting a linear position of the dispatching implement to avoid interference with the curved crop row. FIG. 1 illustrates the elevation of the dispatching implement, while FIGS. 19 and 20 illustrate linear displacement and angular displacement of the dispatching implement 1556, respectively. Arrow 1990 indicates the linear adjustment of the dispatching implement 1556. The linear adjustment is provided by the linear position actuator 999 situated at the row unit 108 or the hitch assembly 330, for example. Arrow 1992 indicates movement of the dispatching implement 1556 after linear displacement of the dispatching implement 1556.

FIG. 20 illustrates how an agricultural implement can manipulate the dispatching implement by adjusting an angular position of the dispatching implement to avoid interference with the curved crop row. Arrow 2020 indicates the angular adjustment of the dispatching implement 1556. The row unit rotation actuator 222 or the array rotation actuator 770 provide the angular adjustment. Arrow 2022 indicates the movement of the dispatching implement 1556 after angular adjustment of the dispatching implement 1556.

What is claimed is:

1. An agricultural implement comprising:
    an implement support frame;
    a plurality of cultivator row units coupled with the implement support frame, each cultivator row unit of the plurality of cultivator row units includes a dispatching implement;
    an angular displacement system coupled with the plurality of cultivator row units, the angular displacement system configured to control an angular position of one or more of the dispatching implements of the plurality of cultivator units relative to proximate crop rows; and
    a sprayer system coupled with the implement support frame, the sprayer system includes:
        a fluid holding tank coupled with the implement support frame;
        a fluid pump in fluid communication with the fluid holding tank; and
        a plurality of fluid nozzles in fluid communication with the fluid holding tank,
    wherein each of the fluid nozzles of the plurality of fluid nozzles is configured to direct fluid between cultivator shovels of the plurality of cultivator row units.

2. The implement of claim 1, further comprising:
    a sensor configured to provide data indicative of a distance between the sensor and ground; and
    a controller coupled to an elevation actuator, the controller configured to cause the elevation actuator to adjust an elevation of the dispatching implement based on the data indicative of the distance.

3. The implement of claim 1, further comprising:
    a position sensor configured to detect a position of the dispatching implement relative to a crop row;
    a controller including a comparator configured to compare the detected position of the dispatching implement with a crop intersection threshold; and
    an elevation actuator coupled with the controller, the controller configured to cause the elevation actuator to control manipulation of the dispatching implement based on the comparison.

4. The implement of claim 3, wherein the controller is configured to control manipulation of the dispatching implement including one or more of elevation, lateral translation, or rotation of the cultivator shovel.

5. The implement of claim 3, wherein the crop intersection threshold includes one or more of a detected edge of a crop, indexed edge of a crop row, or border of a crop row offset from crops.

6. The implement of claim 3, wherein the position sensor includes a mechanical feeler.

7. The implement of claim 1, wherein the angular displacement system includes:

a position sensor configured to detect a position of the dispatching implement relative to a crop row; and a controller including a comparator configured to compare the detected position of the dispatching implement with a crop intersection threshold; a rotation actuator coupled with the controller and with one or more of the implement support frame or one or more cultivator row units of the plurality of cultivator row units, wherein the controller causes the rotation actuator to alter the angular position of the one or more dispatching implements according to the comparison.

8. The implement of claim 7, wherein the controller causes the rotation actuator to alter the angular position of the one or more dispatching implements to reduce a difference between the detected position and the crop intersection threshold.

9. The implement of claim 7, wherein the rotation actuator controls the angular position of the one or more dispatching implements between straight line and curved crop rows.

10. The implement of claim 1, further comprising a lateral displacement system coupled with the plurality of cultivator row units, the lateral displacement system configured to alter a longitudinal position of the row unit along the implement support frame.

11. The implement of claim 10, wherein the lateral displacement system includes:

a position sensor configured to detect a position of the dispatching implement relative to a crop row;

a controller including a comparator configured to compare the detected position of the dispatching implement with a crop intersection threshold; and a linear position actuator coupled with the controller and the implement support frame, wherein the linear position actuator alters the linear position of one or more row units of the plurality of row units according to the comparison and based on a command form the controller.

12. The implement of claim 11, wherein the controller causes the linear position actuator to alter the linear position of one or more cultivator row units of the plurality of row units to reduce a difference between the detected position and the crop intersection threshold.

13. The implement of claim 11, wherein the linear position actuator controls the linear position of one or more cultivator row units of the plurality of row units between both straight line and curved crop rows.

14. The implement of claim 1, further comprising a sensor configured to detect plants.

15. The implement of claim 14, wherein the sprayer system further includes a flow valve actuator and the implement further comprises:

a controller configured to control a state of the flow valve actuator communicatively coupled to a fluid nozzle, the flow valve actuator configured to manage fluid flow through the fluid nozzle, the controller configured to cause the flow valve actuator to open the fluid nozzle in response to detecting a plant and close the fluid nozzle in response to failure to detect the plant.

16. The implement of claim 1, wherein (a) the fluid nozzles are mechanically coupled to the implement support frame (b) the fluid nozzles are respectively coupled to a respective cultivator row unit of the cultivator row units, or a combination thereof.

17. The implement of claim 16, further comprising:

a height sensor configured to provide data indicative of a distance between the height sensor and a crop; and a controller coupled to respective actuators configured to control a distance between respective nozzles and the crop based on the distance.

18. The implement of claim 1, wherein the plurality of fluid nozzles includes an electrostatic spray nozzle.

19. The implement of claim 1, wherein the dispatching implement includes a cultivator shovel, an electrostatic implement, or a laser implement.

* * * * *

UNITED STATES PATENT AND TRADEMARK OFFICE
CERTIFICATE OF CORRECTION

PATENT NO. : 12,302,894 B2
APPLICATION NO. : 17/552153
DATED : May 20, 2025
INVENTOR(S) : Kocer et al.

It is certified that error appears in the above-identified patent and that said Letters Patent is hereby corrected as shown below:

In the Specification

In Column 11, Line 9, delete "(e." and insert --(e.g.,-- therefor

In Column 12, Line 39, delete "grove" and insert --groove-- therefor

In Column 12, Line 41, after "move", insert --(e.g.,--

In Column 13, Line 34, delete "10" and insert --104-- therefor

In Column 14, Line 41, delete "126," and insert --226,-- therefor

In Column 14, Line 42, delete "128." and insert --106.-- therefor

In Column 14, Line 44, delete "128" and insert --106-- therefor

In Column 14, Line 50, delete "128" and insert --106-- therefor

In Column 14, Line 58, delete "128" and insert --106-- therefor

In Column 14, Line 62, delete "soil if" and insert --soil. If-- therefor

In Column 14, Line 65, delete "128" and insert --106-- therefor

In Column 15, Line 8, delete "126," and insert --226,-- therefor

In Column 16, Line 49, delete "126" and insert --226-- therefor

Signed and Sealed this
Sixteenth Day of September, 2025

Coke Morgan Stewart
*Acting Director of the United States Patent and Trademark Office*